United States Patent
Jia et al.

(10) Patent No.: US 12,473,594 B2
(45) Date of Patent: Nov. 18, 2025

(54) CHEMICAL TAGGING-BASED METHOD FOR MODIFIED NUCLEOSIDE SEQUENCING, ENRICHMENT, AND MEASUREMENT

(71) Applicant: PEKING UNIVERSITY, Beijing (CN)

(72) Inventors: Guifang Jia, Beijing (CN); Ye Wang, Beijing (CN); Shunqing Dong, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 890 days.

(21) Appl. No.: 17/624,761

(22) PCT Filed: Jul. 1, 2020

(86) PCT No.: PCT/CN2020/099707
§ 371 (c)(1),
(2) Date: Jan. 4, 2022

(87) PCT Pub. No.: WO2021/000889
PCT Pub. Date: Jan. 7, 2021

(65) Prior Publication Data
US 2023/0332219 A1      Oct. 19, 2023

(30) Foreign Application Priority Data
Jul. 4, 2019 (CN) .......................... 201910601133.7

(51) Int. Cl.
| | |
|---|---|
| *C12Q 1/68* | (2018.01) |
| *C07H 21/02* | (2006.01) |
| *C12Q 1/6809* | (2018.01) |
| *C12Q 1/6869* | (2018.01) |
| *C12Q 1/6886* | (2018.01) |

(52) U.S. Cl.
CPC ........... *C12Q 1/6869* (2013.01); *C07H 21/02* (2013.01); *C12Q 1/6809* (2013.01); *C12Q 1/6886* (2013.01); *C12Q 2600/106* (2013.01)

(58) Field of Classification Search
CPC ................ C12Q 1/6869; C12Q 1/6809; C12Q 1/6886; C12Q 2600/106; C12Q 1/6806; C07H 21/02; C07H 1/00
See application file for complete search history.

(56) References Cited

U.S. PATENT DOCUMENTS

2006/0210990 A1   9/2006   Todd et al.
2016/0194696 A1   7/2016   Guan et al.

OTHER PUBLICATIONS

Fu (Fu et al.; Nature Communications, vol. 4, pp. 1-8, Apr. 30, 2013) (Year: 2013).*
Traube (Traube & Carell; RNA Biology, vol. 14, pp. 1099-1107, Apr. 6, 2017) (Year: 2017).*
English translation of International Search Report issued in PCT/CN2020/099707 on Nov. 3, 2020.
Fu, Ye, et al. "FTO-mediated formation of N6-hydroxymethyladenosine and N6-formyladenosine in mammalian RNA," Nature Communications, Apr. 30, 2013. DOI: 10.1038/ncomms2822.
Zhang, Xiao, et al. "Structural insights into FTO's catalytic mechanism for the demethylation of multiple RNA substrates," PNAS Feb. 19, 2019 116 (8) 2919-2924; first published Feb. 4, 2019; https://doi.org/10.1073/pnas.1820574116.
Wei, Lian-Huan et al. "The m6A Reader ECT2 Controls Trichome Morphology by Affecting mRNA Stability in *Arabidopsis*," The Plant Cell, vol. 30: 968-985, May 2018.

* cited by examiner

*Primary Examiner* — Jehanne S Sitton
*Assistant Examiner* — Bailey Buchanan
(74) *Attorney, Agent, or Firm* — Meunier Carlin & Curfman LLC

(57) ABSTRACT

Provided is a chemical tagging-based method for modified nucleoside sequencing, enrichment, and measurement, comprising reacting a thiol compound with an N-hydroxymethyl chemically modified nucleoside, then using a chemical tag such as biotin to perform tagging, and then enriching and sequencing or measuring. In the method of the present invention, selective chemical tagging is used, and the selectivity of the chemical reaction ensures result specificity and reduces false positive results.

18 Claims, 29 Drawing Sheets

Specification includes a Sequence Listing.

A

B

6mA-SEAL

6mA-MeDIP-seq (Fu 2015)

| initial amount (μg) | conserved motif * | P value |
|---|---|---|
| 10 | | $10^{-85}$ |
| 5 | | $10^{-64}$ |
| 1 | | $10^{-65}$ |
| 0.5 | | $10^{-99}$ |
| 0.2 | | $10^{-73}$ |
| 0.05 | | $10^{-72}$ |

\* In the conserved motif, the size of words of bases reflected the probability of bases of appearance in that site.

FIG. 42

CHEMICAL TAGGING-BASED METHOD FOR MODIFIED NUCLEOSIDE SEQUENCING, ENRICHMENT, AND MEASUREMENT

This application claims the priority of the Chinese Patent Application No. 201910601133.7, with the title of "Chemical tagging-based method for modified nucleoside sequencing, enrichment, and measurement", filed on Jul. 4, 2019 before the China National Intellectual Property Administration, which is hereby incorporated by reference in its entirety.

FIELD OF THE INVENTION

The invention relates to a field of molecular biology, in particular to a chemical tagging-based method for modified nucleoside sequencing, enrichment, and measurement.

BACKGROUND OF THE INVENTION $N^6$-methyladenine ($m^6A$) is the most abundant nucleic acid modification in eukaryotic messenger RNA, having a property of dynamic reversibility and capable to regulating the metabolism and translation of a transcript so as to influence various important biological processes of cancers, immunity, neurodevelopment, etc. A transcriptome sequencing of $m^6A$ can provide a distribution profile thereof, which is of great importance to the study on downstream biological function.

Currently, there are two main approaches of nucleic acid modification, antibody-based and chemical-based methods. A present $m^6A$ sequencing approach is based on an immunoprecipitation (MeRIP, Methylated RNA immunoprecipitation) of $m^6A$ antibody. It uses $m^6A$ antibody to enrich methylation modified RNA from fragmented mRNA for library construction and high-throughput sequencing, thereby obtaining methylation modified regions on transcriptome. This technique is widely used in $m^6A$ studies for revelation of dynamic changes of such RNA methylated modifications and downstream functions thereof during various biological processes. In addition to specific antigen molecules, antibodies may also non-specifically identify other molecules with similar structures. For example, an antibody of $m^6A$ can not only bind to methylation modified adenosine, but also bind to unmodified adenosine, and it may show a preference for RNA containing specific secondary structures. Thus, fragments obtained by MeRIP-seq include RNA with or without $m^6A$, which will result in interference in sequencing results and subsequent biological analysis. Furthermore, the antibodies are expensive and not conducive to the large-scale experiments, and hinder in-depth studies of biological functioned of $m^6A$.

The advantages of chemical methods include high specificity and higher enrichment efficiency than non-covalent bonds between antibodies and nucleic acids due to the formation of covalent bonds between molecules for enrichment and nucleic acids. The key to assist modified nucleic acid sequencing by using chemical methods is to find a molecule that only react with specific modified nucleic acids and not react with other nucleic acids (i.e., find an "orthogonal" reaction type specific to target nucleic acids). Further, as the abundance of modified nucleic acids fragments is generally low, the reaction efficiency must be high. In addition, the reaction had better occur in an aqueous phase because nucleic acids are insoluble in an organic phase.

FTO protein encoded by FTO genes is a Fe(II) and 2-ketoglutaric acid-independent dioxygenase (Gerken et al., 2007), and is also a firstly reported demethylase of $m^6A$ (Jia et al, 2011). In 2012, Fu and Jia revealed that intermediates of $N^6$-hydroxymethyladenosine ($hm^6A$) were generated during the demethylation process of FTO. At the same time, intermediates of $f^6A$ of $N^6$-formyladenosine ($f^6A$) were also generated (Fu et al., 2013). Both $hm^6A$ and $f^6A$ generated during the oxidation process of $m^6A$ by FTO can only exist stably for a period of time in aqueous solution, and finally spontaneously remove formaldehyde or formic acid to change back to A, respectively.

In addition to being produced by $m^6A$ (on RNA) during the demethylation process of FTO, $hm^6A$ can also be produced by the reaction of exogenous formaldehyde or cellular endogenous formaldehyde with adenine (on RNA or DNA). It is reported that there is 100-400 μM endogenous formaldehyde in cells (d'A, White, & Casanova-Schmitz, 1982; Tong et al., 2013), and it can reach to 1000 μM in certain tumor tissues (Tong et al., 2010). Relatively constant concentration of formaldehyde is importance for the normal proceed of life activities.

SUMMARY OF THE INVENTION

The inventor firstly finds that a thiol compound can specifically react with $hm^6A$, an intermediate of FTO enzymatic $m^6A$ demethylation. The invention is developed based on the above finding.

Examples of the invention aim to provide a chemical tagging-based method for modified nucleoside sequencing, enrichment, and measurement. Specific technical solution is as follows:

The invention provides a chemical tagging-based method for $m^6A$ sequencing, comprising:
- (a1) treating a sample containing RNA and/or DNA with FTO or formaldehyde, wherein $m^6A$ is converted into $hm^6A$ under the presence of $m^6A$ in the RNA and/or DNA;
- (b1) adding a thiol compound, wherein the $hm^6A$ is reacted with the thiol compound to produce $dm^6A$;
- (c1) adding MTSEA-biotin to react with the $dm^6A$ to obtain a biotinylated RNA and/or DNA;
- (d1) enriching the biotinylated RNA and/or DNA by using streptavidin; and
- (e1) eluting and recovering the biotinylated RNA and/or DNA, constructing libraries and carrying out high-throughput sequencing to determine an $m^6A$ site in the RNA and/or DNA;

wherein, the thiol compound has a structure represented by formula (I):

$$R\text{—}SH \qquad (I),$$

wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol.

The invention also provides a chemical tagging-based method for enrichment of RNA and/or DNA containing $m^6A$, comprising:
- (a2) treating a sample containing RNA and/or DNA with FTO or formaldehyde, wherein $m^6A$ is converted into hm6A under the presence of m6A in the RNA and/or DNA;

(b2) adding a thiol compound, wherein the hm⁶A is reacted with the thiol compound to produce dm⁶A;

(c2) adding MTSEA-biotin to react with the dm⁶A to obtain a biotinylated RNA and/or DNA; and (d2) enriching the biotinylated RNA and/or DNA by using streptavidin;

wherein, the thiol compound has a structure represented by formula (I):

R—SH  (I), wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol.

The invention also provides a chemical tagging-based method for m⁶A measurement, comprising:

(a3) treating a sample containing RNA and/or DNA with FTO or formaldehyde, wherein m⁶A is converted into hm6A under the presence of m6A in the RNA and/or DNA;

(b3) adding a thiol compound, wherein the hm⁶A is reacted with the thiol compound to produce dm⁶A;

(c3) adding chemical tagging, preferably MTSEA-biotin or fluorescein, to react with the dm6A to obtain chemically tagged dm⁶A; and (d3) detecting the chemically tagged dm⁶A by imaging method, e.g., Dot-Blot or gel electrophoresis imaging, to determine the presence of m⁶A in the RNA and/or DNA;

wherein, the thiol compound has a structure represented by formula (I):

R—SH  (I), wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol.

In one embodiment of the invention, FTO is supplied in FTO oxidation system, and a concentration of FTO in the FTO oxidation system is 0.01-2 µM, preferably 0.1-1 µM, more preferably 0.2 µM;

preferably, the FTO oxidation system also comprises $(NH_4)_2Fe(SO_4)_2 \cdot 6H_2O$, L-ascorbic acid and α-ketoglutaric acid, optionally HEPES buffer salt solution with a pH of 7.0;

also preferably, treating a sample containing RNA and/or DNA with the FTO oxidation system for 1-30 min, preferably 1-15 min, more preferably 5 min.

In one embodiment of the invention, the thiol compound is one or more selected form the group consisting of

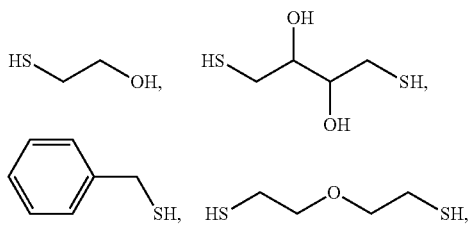

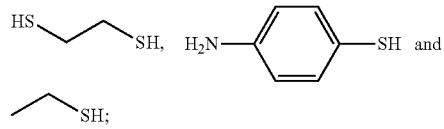

preferably the thiol compound is

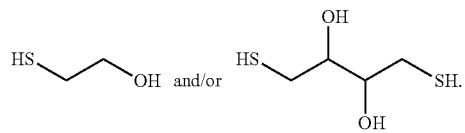

In one embodiment of the invention, the hm⁶A is reacted with the thiol compound at a pH of 2-7, preferably 3-5, more preferably 4, under 25-40° C., preferably 30-40° C., more preferably 37° C. for 1-5 h, preferably 2-4 h, more preferably 3 h;

preferably, a molar ratio of the thiol compound and the RNA and/or DNA is 100,000:1-100:1, preferably 80,000:1-1000:1, more preferably 50,000:1-10,000:1, even more preferably 20,000:1.

In one embodiment of the invention, the MTSEA-biotin is supplied in a biotin tagging system, and a concentration of MTSEA-biotin in the biotin tagging system is 0.01-1 mM, preferably 0.05-0.5 mM, more preferably 0.1 mM; preferably, the biotin tagging system also comprises: HEPES buffer salt solution with a pH of 7.0, EDTA and DMF.

In one embodiment of the invention, RNA is total RNA, poly(A)⁺RNA, rRNA or lncRNA extracted form cells.

The invention also provides a method for preparing compound dm⁶A, comprising reacting compound hm⁶A with a thiol compound; wherein the thiol compound has a structure represented by formula (I):

R—SH  (I), wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol;

preferably, the thiol compound is one or more selected form the group consisting of

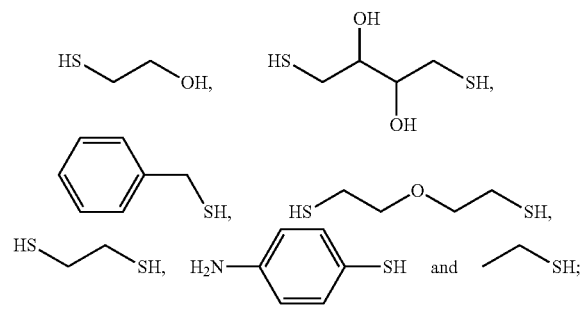

more preferably, the thiol compound is

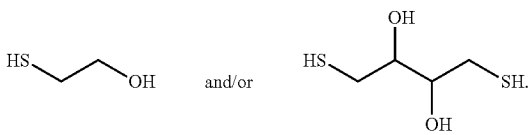

In one embodiment of the invention, the hm⁶A is reacted with the thiol compound at a pH of 2-7, preferably 3-5, more preferably 4, under 25-40° C., preferably 30-40° C., more preferably 37° C. for 1-5 h, preferably 2-4 h, more preferably 3 h;

preferably, a molar ratio of the thiol compound and the RNA and/or DNA is 100,000:1-100:1, preferably 80,000:1-1000:1, more preferably 50,000:1-10,000:1, even more preferably 20,000:1.

The invention also provides a chemical tagging-based method for N-hydroxymethyl modified nucleoside sequencing, comprising:

(b4) adding the thiol compound to a sample containing RNA and/or DNA to react N-hydroxymethyl modified nucleoside in the RNA and/or DNA with the thiol compound under the presence of N-hydroxymethyl modified nucleoside in the RNA and/or DNA;

(c4) adding MTSEA-biotin or HPDP-biotin to react to obtain a biotinylated RNA and/or DNA;

(d4) enriching the biotinylated RNA and/or DNA by using streptavidin; and (e4) eluting and recovering the biotinylated RNA and/or DNA, constructing libraries and carrying out high-throughput sequencing to determine N-hydroxymethyl modified nucleoside sites in the RNA and/or DNA;

wherein, the thiol compound has a structure represented by formula (I):

R—SH    (I), wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol.

preferably, the thiol compound is one or more selected form the group consisting of

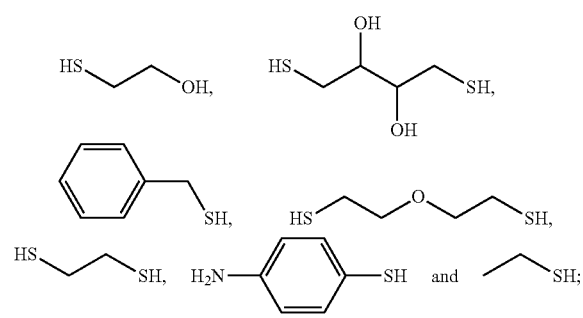

more preferably, the thiol compound is

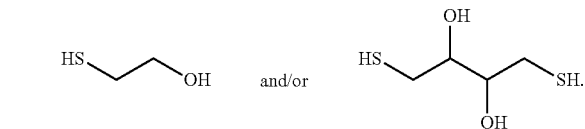

The invention also provides a chemical tagging-based method for N-hydroxymethyl modified nucleoside measurement, comprising:

(b5) adding the thiol compound to a sample containing RNA and/or DNA to react N-hydroxymethyl modified nucleoside in the RNA and/or DNA with the thiol compound under the presence of N-hydroxymethyl modified nucleoside in the RNA and/or DNA;

(c5) adding chemical tagging, preferably MTSEA-biotin or fluorescein, HPDP-biotin or fluorescein to obtain chemically tagged N-hydroxymethyl modified nucleoside; and (d5) detecting the chemically tagged N-hydroxymethyl modified nucleoside by imaging method, e.g., Dot-Blot or gel electrophoresis imaging, to determine the presence of N-hydroxymethyl modified nucleoside in the RNA and/or DNA;

wherein, thiol compound has a structure represented by formula (I):

R—SH    (I), wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol;

preferably, the thiol compound is one or more selected form the group consisting of

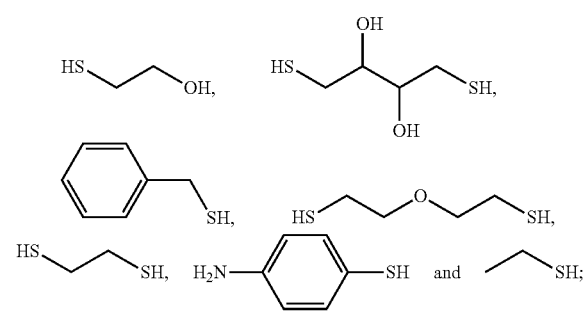

more preferably, the thiol compound is

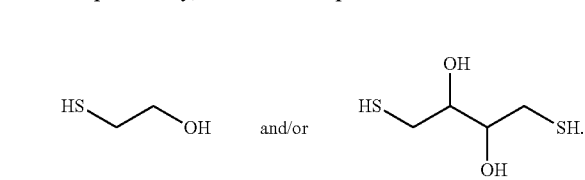

In one embodiment of the invention, N-hydroxymethyl modified nucleoside is selected from the group consisting of N-hydroxymethyl guanosine, N-hydroxymethyl cytidine and N-hydroxymethyl adenosine, preferably hm⁶A, hm⁴C and hm²G.

In one embodiment of the invention, RNA is total RNA, poly(A)+RNA, rRNA or lncRNA extracted form cells;
preferably, a molar ratio of the thiol compound and the RNA and/or DNA is 100,000:1-100:1, preferably 80,000:1-1000:1, more preferably 50,000:1-10,000:1, even more preferably 20,000:1.

The invention also provides use of a thiol compound in the manufacture of a formulation for diagnosing diseases caused by high expressions of FTO, wherein the thiol compound has a structure represented by formula (I):

R—SH  (I),

wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol;
in a particular embodiment, a disease caused by high expressions of FTO is leukemia.

The invention also provides a method for diagnosing diseases caused by high expressions of FTO in a subject, comprising:
adding a thiol compound to a sample containing DNA and/or RNA from the subject;
adding MTSEA-biotin, HPDP-biotin, MTSEA-fluorescein or HPDP-fluorescein after reaction;
detecting biotin or fluorescein signals; and
comparing the detected signals with a control sample to determine whether the subject suffers from diseases caused by high expressions of FTO.

In one embodiment of the invention, the control sample is from subjects without diseases caused by high expressions of FTO, preferably from healthy subjects.

In a particular embodiment, the thiol compound has structure represented by formula (I):

R—SH  (I),

wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol.

In a particular embodiment, a disease caused by high expressions of FTO is leukemia.

The invention also provides a method for identifying FTO demethylated substrate, comprising:
(a6) extracting RNA and/or DNA from an over-expressed FTO cell line, FTO knockout cell line and low-expressed FTO cell line to obtain a sample containing RNA and/or DNA;
(b6) adding a thiol compound to the sample containing RNA and/or DNA;
(c6) adding biotin labelings to obtain a biotinylated RNA and/or DNA, wherein the biotin labelings are preferably MTSEA-biotin or HPDP-biotin;
(d6) enriching the biotinylated RNA and/or DNA by using streptavidin magnetic beads;
(e6) eluting and recovering the biotinylated RNA and/or DNA, constructing libraries and carrying out high-throughput sequencing; and
(f6) according to the sequencing results, determining that: extra hydroxymethyl sites in the over-expressed FTO cell line than in a control cell line are FTO demethylation substrates; reduced hydroxymethyl sites in FTO knockout or low-expressed FTO cell lines than in control cell lines are also FTO demethylation substrates;
wherein, the thiol compound has a structure represented by formula (I):

R—SH  (I),

wherein, R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol;
preferably, the thiol compound is one or more selected form the group consisting of

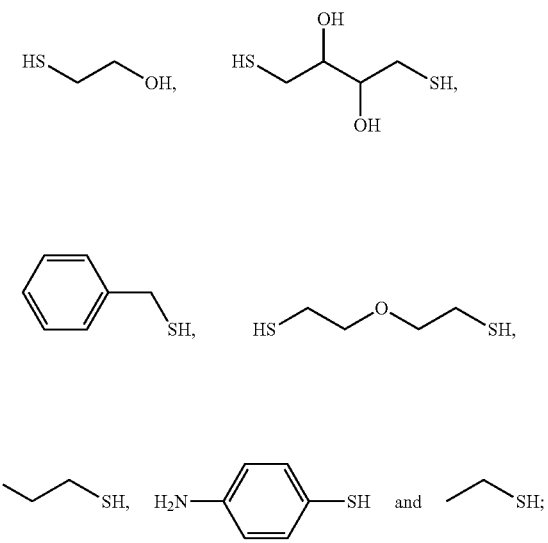

more preferably, the thiol compound is

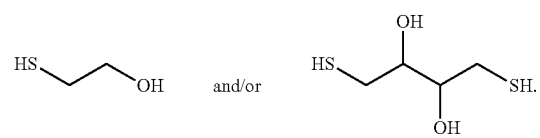

One embodiment of the invention provides a high-throughput sequencing method based on an $m^6A$ selective chemical labeling ($m^6A$-SEAL), comprising following reaction processes:

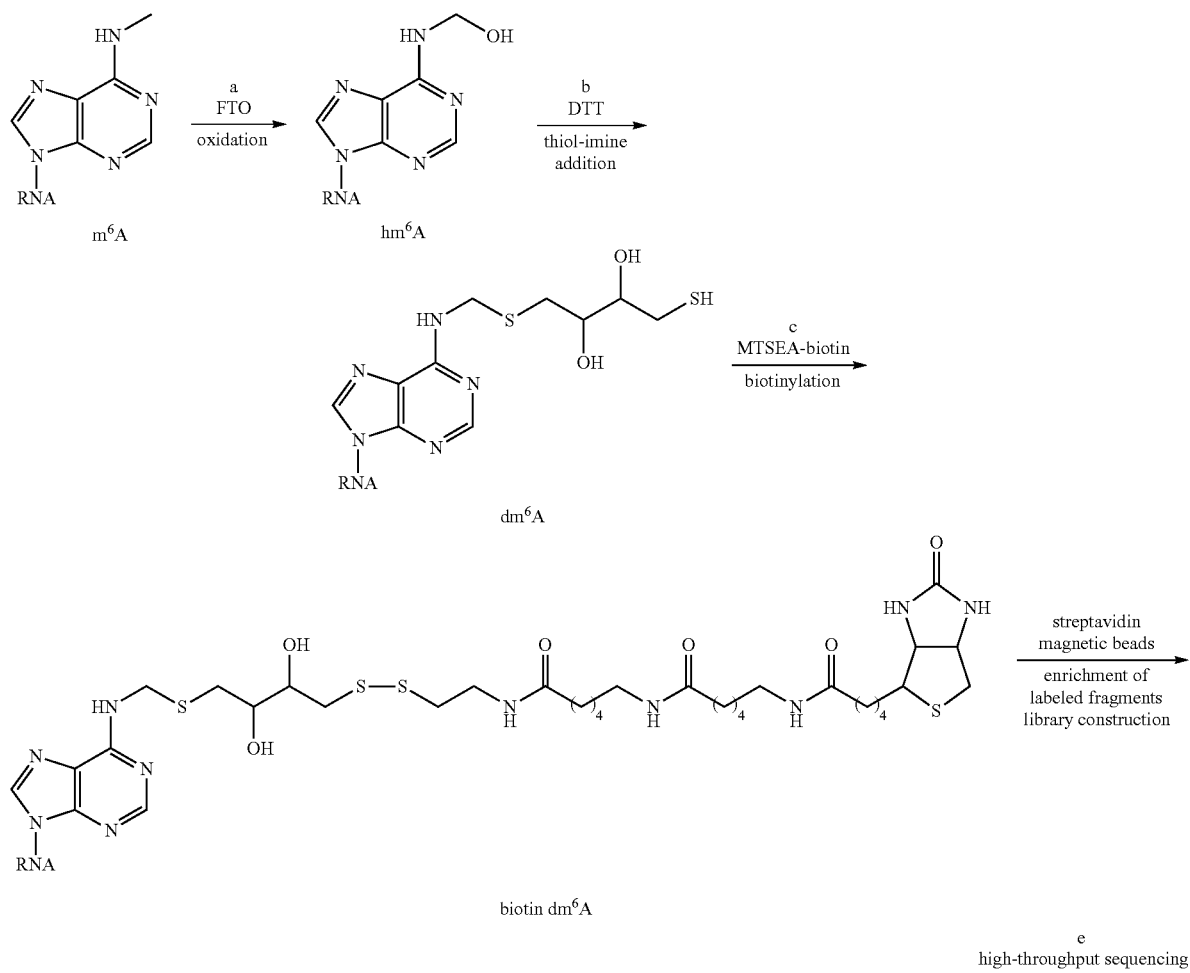

The invention utilizes a fact that demethylase FTO can specifically oxidize chemically inert m⁶A methyl into active hm⁶A, which enables the chemical tagging of m⁶A. The thiol compound is also used to react with hm⁶A hemiaminal functional group to convert unstable hm⁶A into stable dm⁶A, thereby finally successfully achieving the chemical tagging of m⁶A and subsequent applications in sequencing.

Current technical defect of antibody-based m⁶A sequencing method (MeRIP-seq) is that antibodies will non-specifically bind to a portion of RNA, resulting in false positive results. Because the method of the invention does not rely on antibodies, but utilizes selective chemical taggings, the selectivity of chemical reactions ensures the specificity of results and reduces the false positive results.

FTO will produce intermediates of hm⁶A during the oxidation—demethylation process of. Thiol addition reaction of m⁶A-SEAL can label hm⁶A, thus we can label FTO demethylation substrate RNA and sites by this technique. For example, the over-expressed FTO cell line and the control cell line react with DTT at the same time, and then respective N-hydroxymethyl sites are sequenced. Extra sites (hm⁶A) in the over-expressed FTO cell line over the control cell line are probably potential FTO demethylation active sites. Additionally, researchers have found that there was over-expressed FTO in leukemia cells. We extract RNA from these leukemia cells with over expression of FTO and lymphocytes with normal expression of FTO, and make them react respectively with DTT. Similarly, the obtained difference sites by sequencing may be active sites of FTO demethylation in the leukemia cells. Obtaining information of these sites by the method will have great importance to the in-depth understanding of the role that FTO and m⁶A play in disease development of human.

DESCRIPTION OF THE DRAWINGS

In order to more clearly explain the examples of the present invention and the technical solutions of the prior art, the following briefly introduces the drawings used in the examples and the prior art. Obviously, the drawings in the following description are only for some examples of the invention, for those skilled in the art, other drawings may be obtained based on these drawings without paying any creative labor.

FIG. 42 shows different initial amounts of poly(A)+RNA and the conserved motif obtained.

DETAILED DESCRIPTION OF THE INVENTION

In order to make the purpose, technical scheme and advantages of the present invention clearer, the present invention will be further explained in detail with reference to the attached drawings and examples. Obviously, the described examples are only a part of examples of the invention, rather than all examples. Based on the examples of the invention, all other examples obtained by those skilled in the art without doing creative work belong to the protection scope of the invention.

Example 1 Synthesis, Purification and Characteristic of N$^6$-Hydroxymethyl Adenine Nucleoside (hm$^6$A)

(1) Experiment Materials and Agents

Aenosine (J&K Chemical), formaldehyde (37% aqueous solution) (Guangzhou Xilong Fine Chemical Technology Co., Ltd.)

(2) Experimental Apparatus

Preparative high performance liquid chromatography (waters 2545, Xbridge™ Prep C18, 5 μm)

(3) Synthesis and Purification of hm$^6$A Adenosine 2 g adenosine was dissolved in 20 mL water (adenosine has low solubility in water and forms a suspension), and 1 mL of 37% formaldehyde was added. They were stirred with a magnet rotor, reacted for 10 min at 60° C., and then 20% urea was added to stop the reaction. After being dried by rotation at 55° C., a vacuum pump was used to pump to dry, and products were white solids. The products were purified by preparative HPLC columns. Loading quantity of samples was 200-300 mg, and gradient was 5-20% acetonitrile (0-20 min). A second major peak eluting products was collected (eluting products at about 10 min), and the products were freeze-dried.

(4) NMR Characterization of hm$^6$A Adenosine

The purified hm$^6$A was characterized by using 700 MHz NMR H-H-COSY pattern of Beijing Nuclear Magnetic Center.

Figure 1:
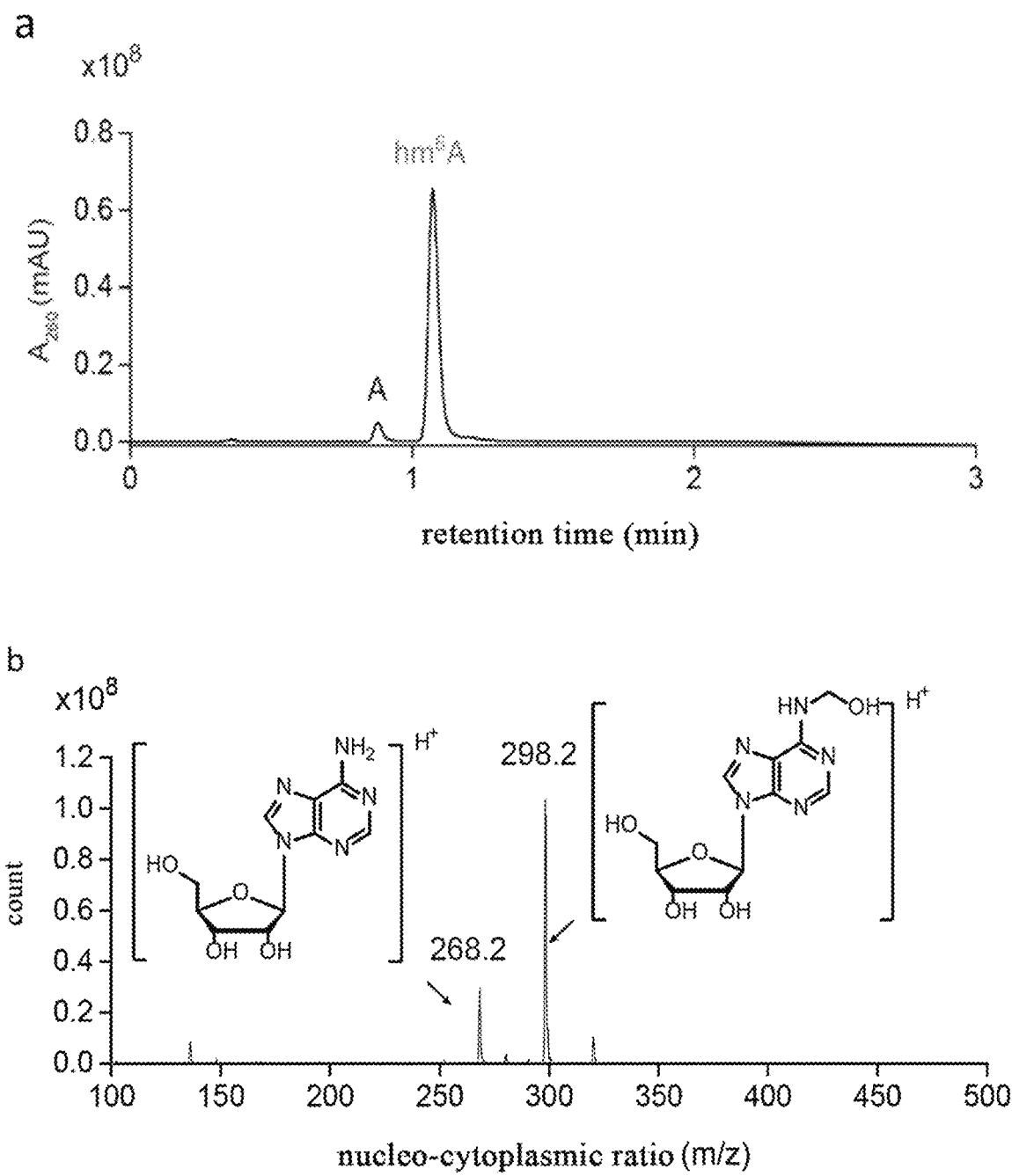
FIG. 1 shows LC-MS characteristic of hm⁶A, wherein a is the chromatogram of hm⁶A and b is the mass spectrogram of hm⁶A.

LC-MS results (FIG. 1) showed N$^6$-hydroxymethyl adenine nucleoside with a purity of 95% was obtained. UV absorption peak of the products was 211 nm, and 265 nm. Compared with raw material adenine (207 nm, 260 nm), it shifted to long wavelength, and a nuclear-mass ratio (m/z) was 298.3, which was consistent with m/z of hm$^6$A+hydrogen ions. At the same time, fragment ion of 268.3 could be seen, and it was caused by the partial degradation of hm$^6$A into adenosine during the ionization process.

Figure 2:
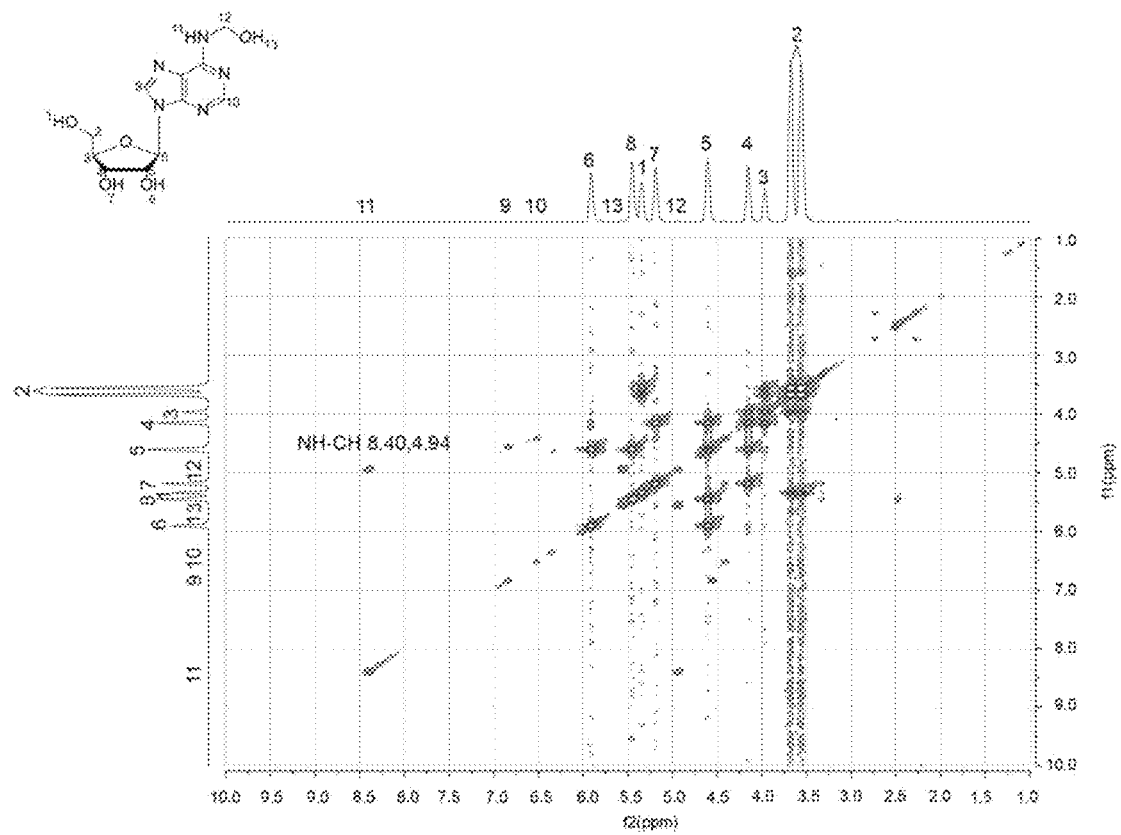
FIG. 2 shows H-H COSY NMR characteristic of hm⁶A.

In order to determine that hydroxymethylation was occurred at position N$^6$, hydrogen-hydrogen related two dimensional nuclear magnetic spectroscopy (H-H COSY) was analysed (FIG. 2). In H-H COSY spectroscopy, coupling signals of amino hydrogen and adjacent methylene hydrogen (NH—CH, 8.54-4.71) was observed, which proved that the product was indeed N$^6$-hydroxymethyl adenine.

Example 2 Reaction of N$^6$-Hydroxymethyl Adenine Nucleoside and a Thiol Compound (1) Experiment Materials and Agents Dithiothreitol (INACOL), mercaptoethanol (amresco), 3-mercaptopropionic acid (J&K Chemical), 4-aminothiophenol (J&K Chemical), 2-aminoethanethiol hydrochloride (J&K Chemical), benzyl mercaptane (J&K Chemical), 1,2-dithioglycol (J&K Chemical), ethanethiol (J&K Chemical), bis (2-mercaptoethyl) ether (TCI)

(2) Experimental Apparatus

Thermomixer (Eppendorf), single quadrupole liquid chromatography-mass spectrometry (SQ-detector2, waters)

(3) Experiment Steps

A reaction system was as shown in Table 1.

TABLE 1

Reaction system of N$^6$-hydroxymethyl adenine nucleoside and a thiol compound

| component | concentration of stock solution | final concentration | added volume of stock solution |
|---|---|---|---|
| hm$^6$A | 5 mM | 1 mM | 20 |
| thiol compound | 1M | 200 mM | 20 |
| HEPES pH = 4 | 1M | 100 mM | 10 |
| methanol/water | | | 50 |

A reaction vessel was a 1.5 mL EP tube, which was added with hm$^6$A solution and stock solutions of different thiol compounds, wherein the stock solutions of dithiothreitol, mercaptoethanol and 3-mercaptopropionic acid are aqueous solutions, which were added up to 100 μL with water after addition. The stock solutions of 4-aminothiophenol, 1,2-dithioglycol, ethanethiol and bis (2-mercaptoethyl) ether were methanol solutions, which were added up to 100 μL with methanol after addition. Then HEPES buffer salt solution with designated pH was added to react for 3 h on Thermomixer at 42° C. The products were identified by LC-MS after 100-fold dilution. Monitoring UV absorption channel was 180-400 nm. A range of mass-to-charge ratio of mass spectrometric detection (m/z) was 100-700.

(4) Experiment Results

In the application, reaction products of different thiol compounds and hm$^6$A were named dm$^6$A. In a specific embodiment, in order to distinguish the reaction products of different thiol compounds and hm$^6$A, the reaction products of different thiol compounds and hm$^6$A were respectively named. For example, a reaction product of DTT and hm$^6$A was named DTT-6-A (or DTT-6A), and a reaction product of β-ME and hm$^6$A was named β-ME-6-A (or β-ME-6A).

Figure 3:
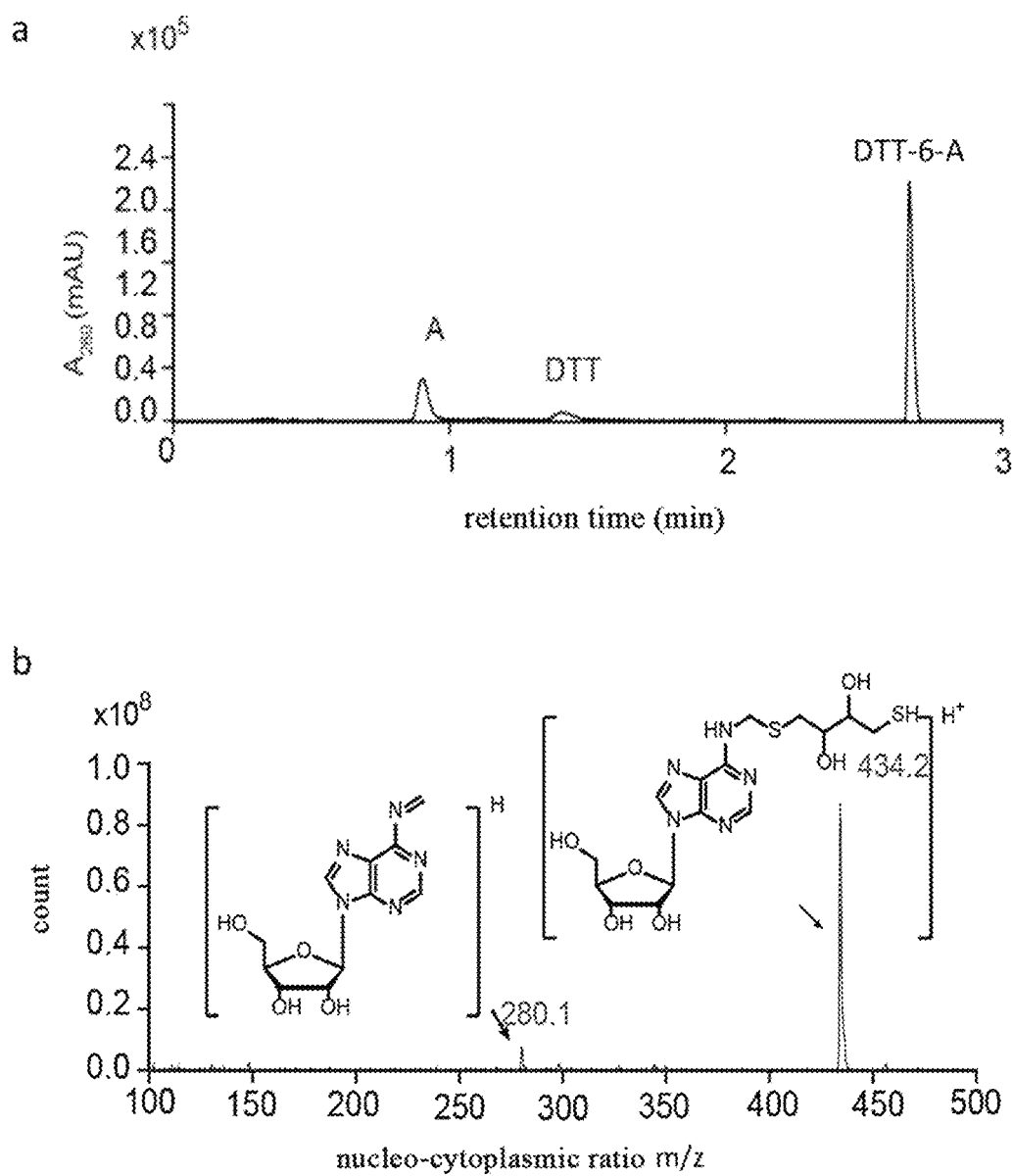
FIG. 3 shows LC-MS characteristic of DTT-6-A, wherein a is the chromatogram of DTT-6-A and b is the mass spectrogram of DTT-6-A.
Figure 4:
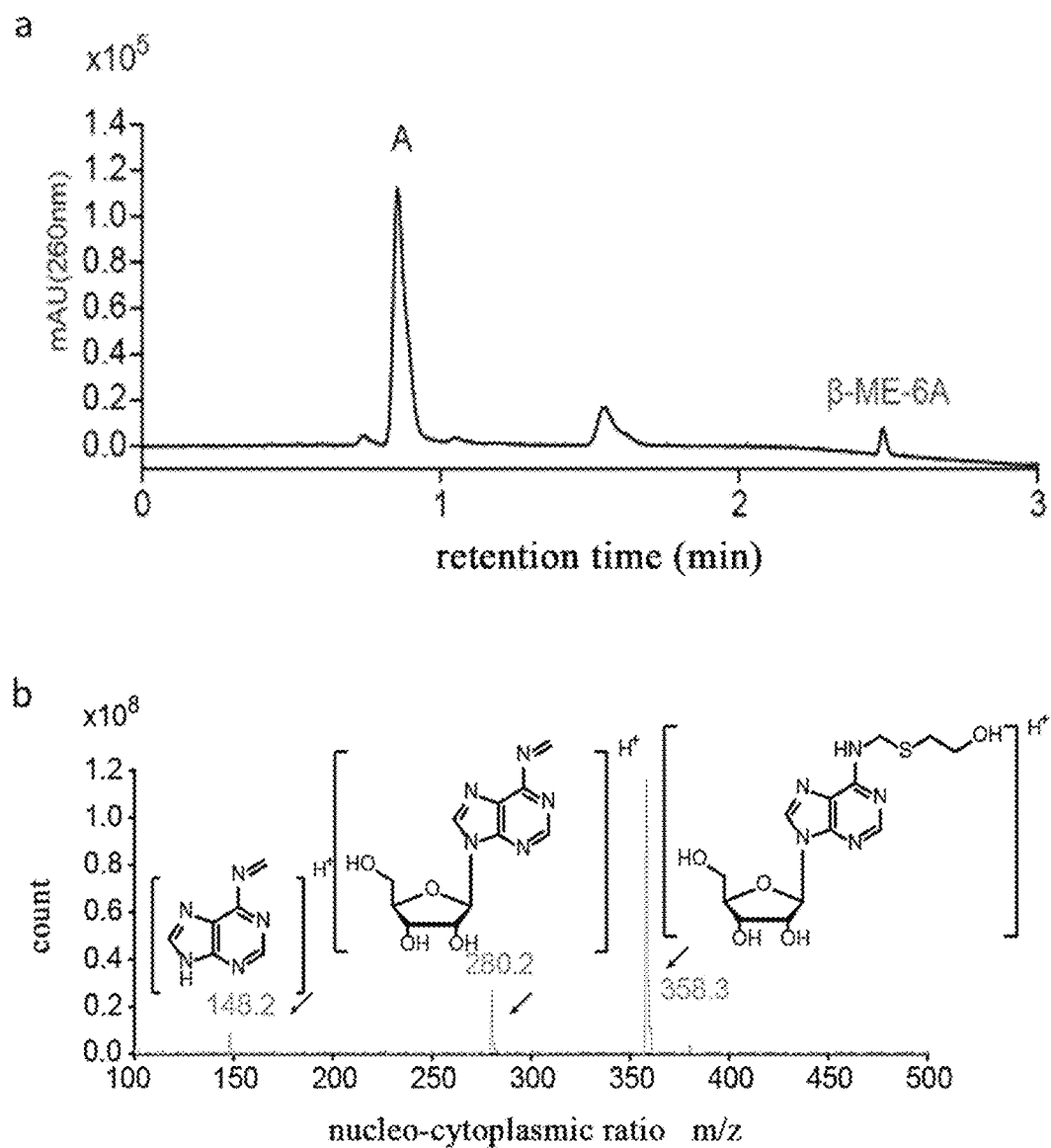
FIG. 4 shows LC-MS characteristic of β-ME-6A, wherein a is the chromatogram of β-ME-6A and b is the mass spectrogram of β-ME-6A.

New products were generated after reacting for 3 h at 37° C. The product was more hydrophobic (longer elution time). The m/z of DTT-6-A, the reaction product of DTT and hm$^6$A, was 434.2, which was consistent with expected molecular weight (FIG. 3), and UV absorption peak was 274 nm with a yield of 4.8%. The m/z of β-ME-6-A, the reaction product of β-ME and hm$^6$A, was 358.3, which was consistent with expected molecular weight (FIG. 4), and UV absorption peak was 273 nm with a yield of 4.4%.

Figure 5A:
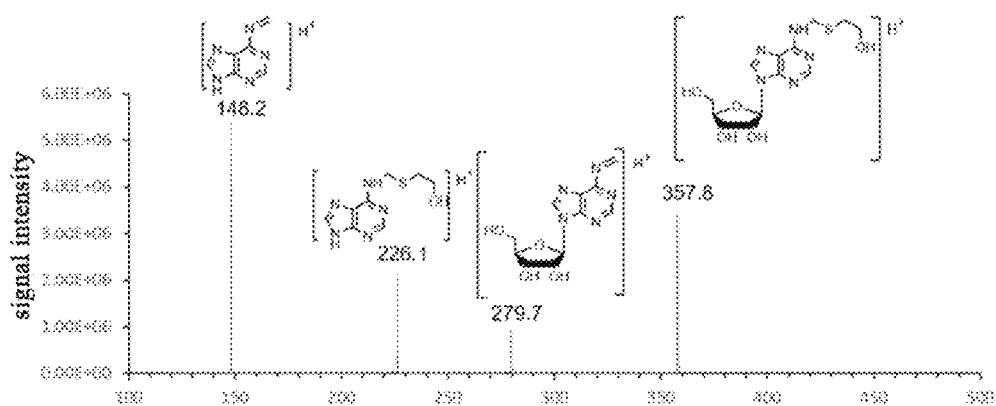
FIG. 5A shows MS characteristic of finer fragment ions of hm$^6$A.
Figure 5B:
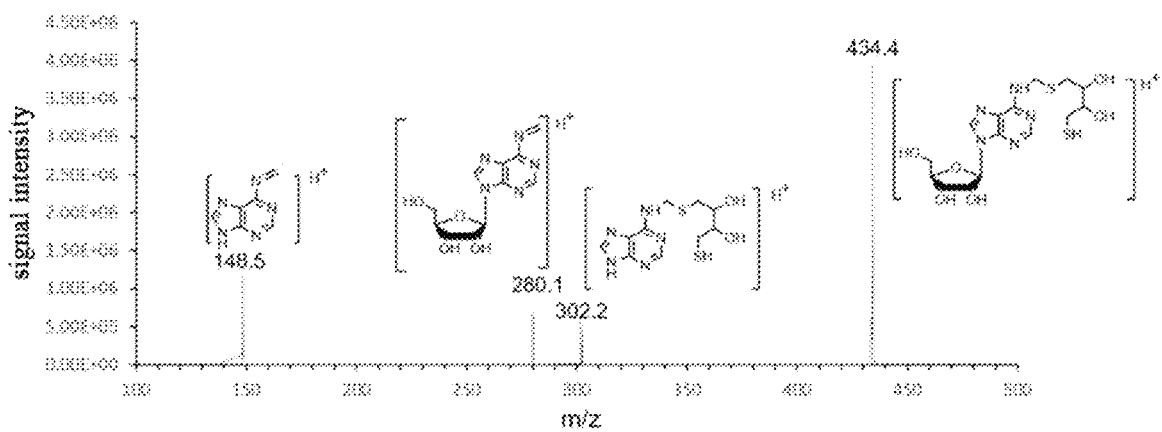
FIG. 5B shows MS characteristic of finer fragment ions of β-ME-6A.

These two products were identified by Q1 mode of high performance liquid chromatography-triple quadrupole mass spectrometry, and their fragment ions were identified more precisely by adjusting collision energy. In the reaction products of DTT, expected parent ions (m/z=434.4) and three fragment ions (m/z=302.2, m/z=280.1, m/z=148.5) were observed. In the reaction products of 3-ME, expected parent ions (m/z=357.8) and three fragment ions (m/z=279.1, m/z=226.1, m/z=148.2) were observed. The appearance of Schiff base fragment ions indicated that the fragmentation pattern of these hm$^6$A derivatives was similar to hm$^6$A (FIG. 5A and FIG. 5B).

Figure 6A:
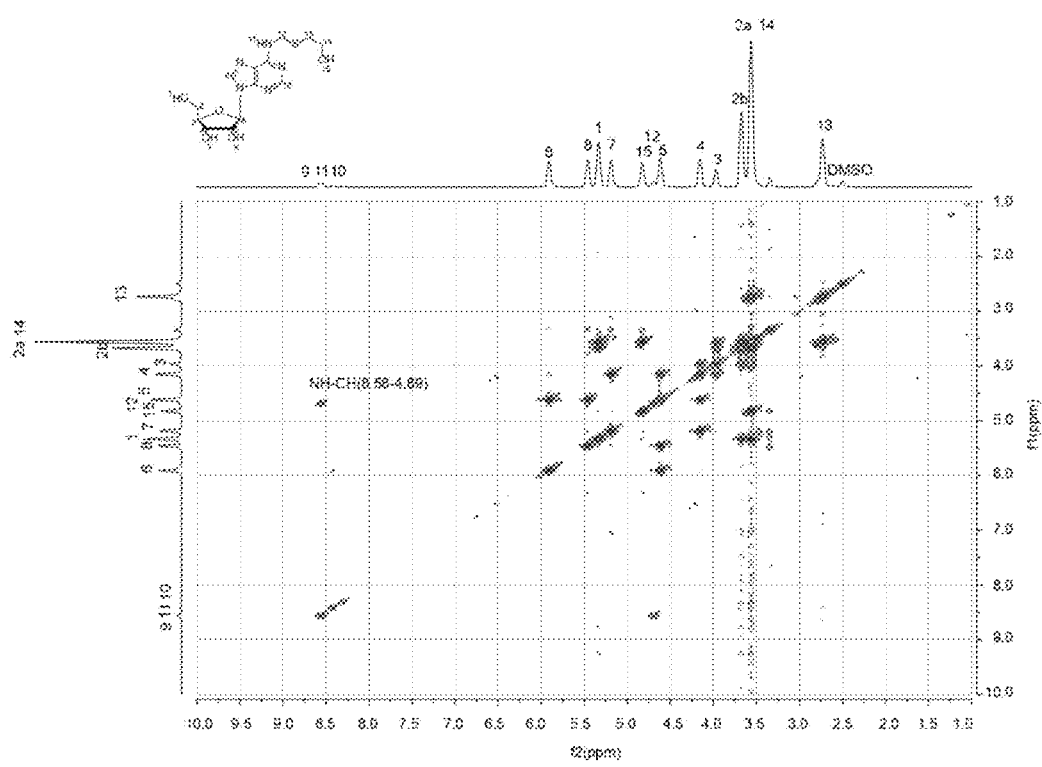
FIG. 6A shows H-H COSY NMR characteristic of β-ME-6A.
Figure 6B:
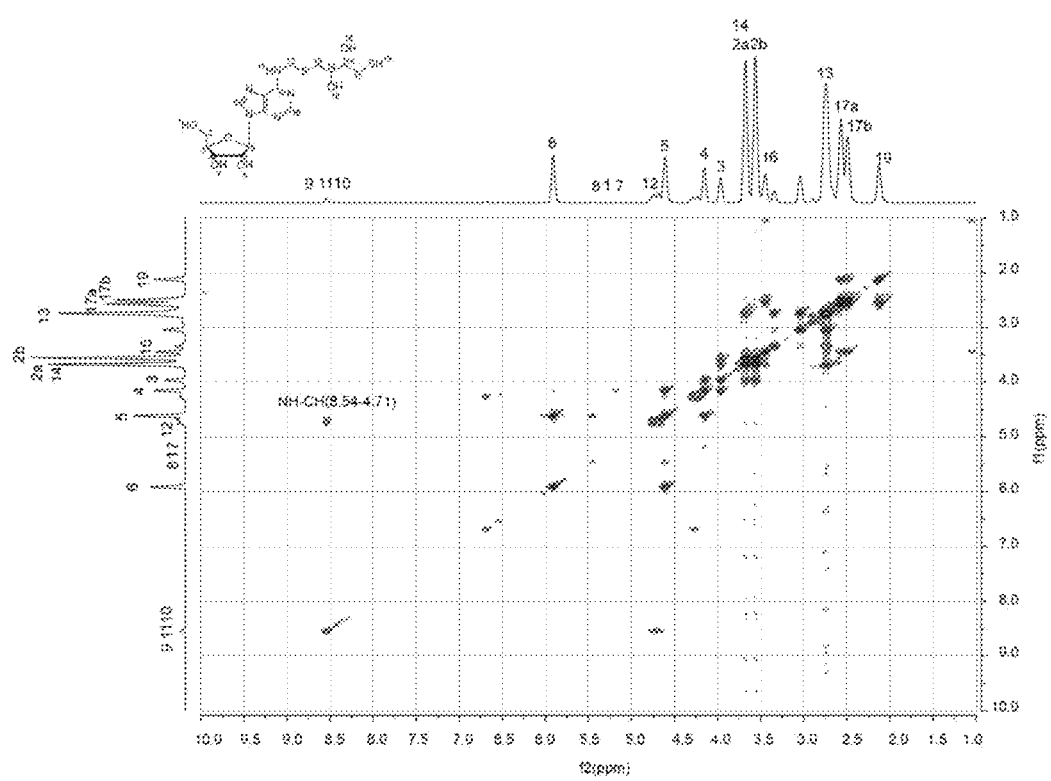
FIG. 6B shows H-H COSY NMR characteristic of hm$^6$A.

These products were characterized by two dimensional nuclear magnetic after purification. Coupling signals of carbon atoms of exocyclic amino hydrogen and methylene bridges were observed in all results, which proved that its structure was similar to hm$^6$A, and derived groups were present at N$^6$ position of adenine (FIG. 6A and FIG. 6B).

Figure 7:
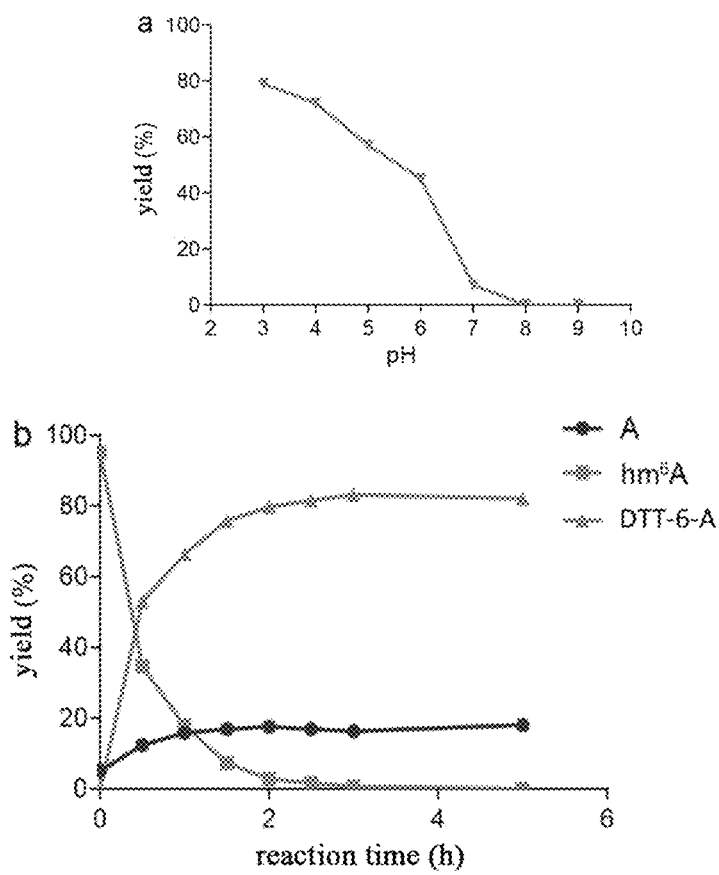
FIG. 7 shows optimization of a reaction condition of hm$^6$A nucleoside and DTT, and characteristic of reaction kinetics; wherein a shows a relationship between a reaction yield and reaction pH of hm$^6$A nucleoside and DTT; b shows characteristic of reaction kinetics of a reaction of hm$^6$A nucleoside and DTT.

Example 3 Conditions for the Reaction of N$^6$-Hydroxymethyl Adenine Nucleoside and a Thiol Compound The reaction yields of two thiol compounds and hm$^6$A were first measured at different pH. Results showed that acidic conditions were more favorable for the reaction. Taking a reaction of DTT and hm$^6$A as an example, when pH dropped from 7 to 4, the reaction yield would increase to 72%. When pH increased to above 8, the reaction yield would drop to 0, and when pH dropped to below 4, the reaction yield would not increase significantly (FIG. 7a). The development of the reaction over time was also tested. It was found that at 37° C. the reaction was substantially complete after 3 h (FIG. 7b). Thus 37° C., 3 h and pH=4 were considered to be ideal reaction conditions.

Figure 8:
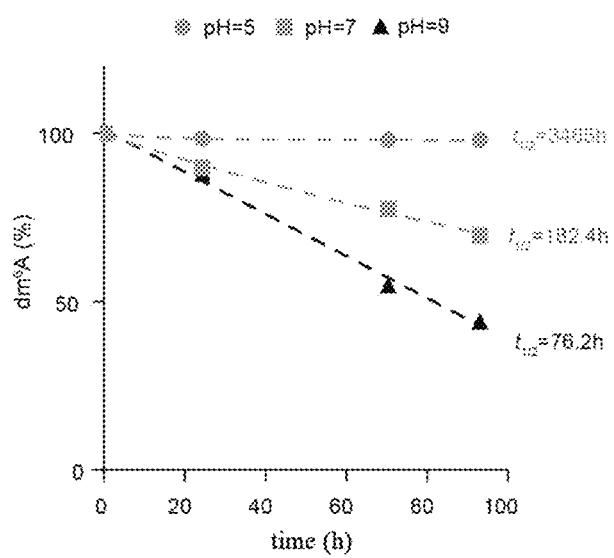
FIG. 8 shows half-life of hm$^6$A at different pH.
Figure 9:
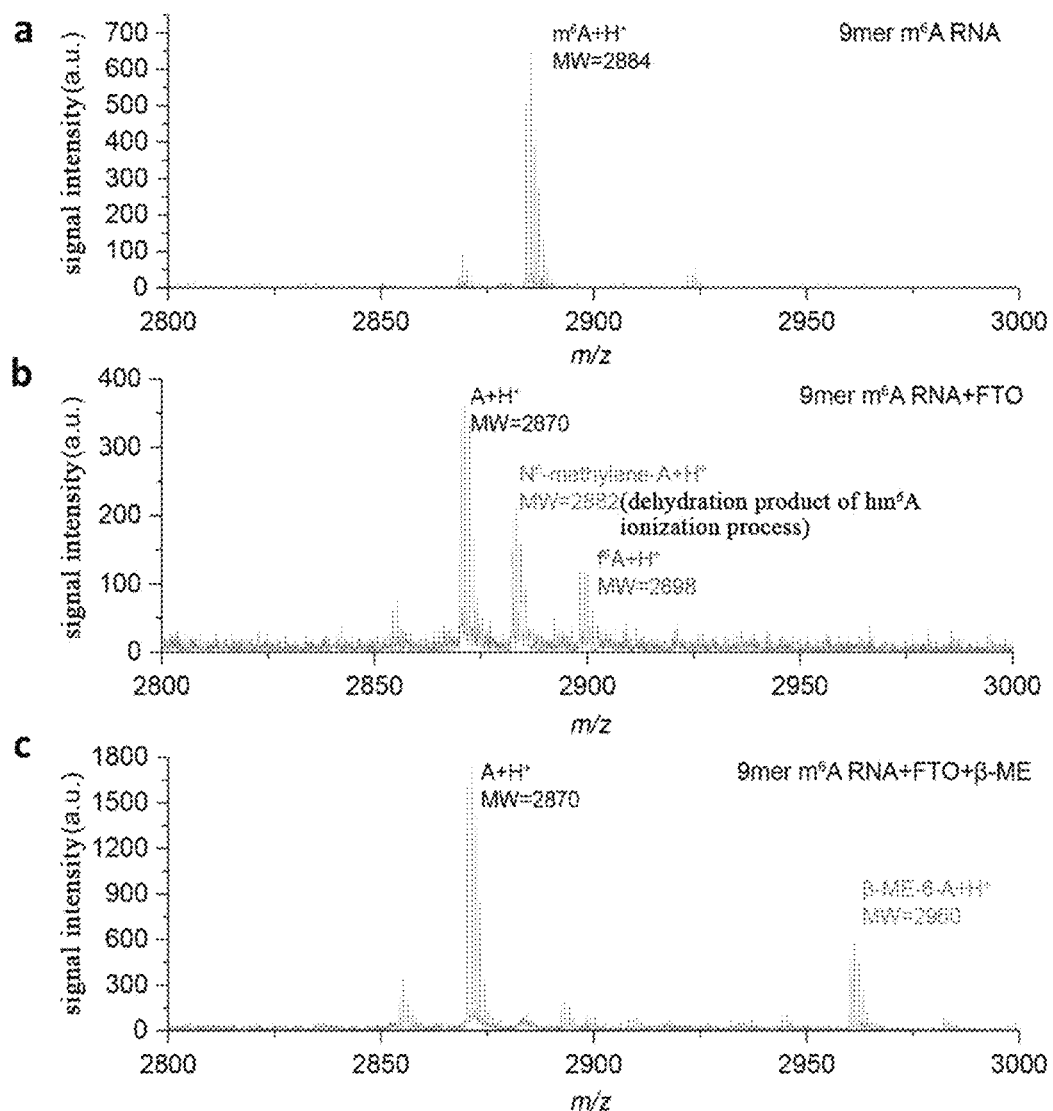
FIG. 9 shows MALDI-TOF mass spectrum results of m$^6$A-containing oligo RNA after oxidation by FTO and reaction with β-ME; wherein a is MALDI-TOF mass spectrum results of m$^6$A-containing oligo RNA; b is MALDI-TOF mass spectrum results of m$^6$A-containing oligo RNA after oxidation by FTO; c is MALDI-TOF mass spectrum results of m$^6$A-containing oligo RNA after oxidation by FTO and reaction with β-ME.

Example 4 Stability Experiment of Reaction Products of a Thiol Compounds and $N^6$-Hydroxymethyl Adenine Nucleoside In order to study whether the stability of product (DTT-6-A) produced by the reaction of $hm^6A$ and DTT was improved compared with $hm^6A$, half-life of DTT-6-A in aqueous solutions with different pH values was measured. Results showed that DTT-6-A was most stable in acidic environment, and the half-life decreased with the increase of pH (FIG. 8). Subsequent treatments and reactions were carried out under neutral environment, and the stability of DTT-6-A under neutral environment (the half-life was 182 h) was far better than that of $hm^6A$ (the half-life was 2 h), and thus, DTT-6-A could be used for subsequent experiments.

Example 5 Reaction of Oligonucleotide Containing $N^6$-Hydroxymethyl Adenine and a Thiol Compound After verifying that nucleoside monomers of $N^6$-hydroxymethyladenine could react with thiol compounds, since the chemical properties of the nucleoside monomers and nucleic acid chain were not completely the same, if this reaction was to be applied to actual sequencing of $m^6A$ or $hm^6A$, further verification was required that the thiol compounds could also react with $hm^6A$ on the nucleic acid chain. This required use of nucleic acid chains with $hm^6A$ to test the reaction. However, the difficulty was that firstly, there was no commercial monomer of $hm^6A$ for solid-phase synthesis of oligonucleotide; secondly, even if such a monomer could be synthesized by itself, the solid-phase synthesis process required more stringent reaction conditions and longer coupling time, and $hm^6A$ might be seriously degraded during this process. Therefore, oligonucleotide chains containing $m^6A$ were firstly produced by solid-phase synthesis in the invention, and treated by FTO for a short time to convert $m^6A$ into $hm^6A$, and then these oligonucleotide chains containing $hm^6A$ were utilized to test the reaction.

(1) Experiment Materials and Agents

Raw materials of phosphoramidite monomers for solid-phase synthesis of RNA were Bz-A-CE phosphoramidite, U-CE phosphoramidite, Ac-C-CE phosphoramidite, G-CE phosphoramidite, $N^6$-methyl-A-CE phosphoramidite, Ac-G-RNA-CPG, which were purchased from $(NH_4)_2Fe(SO_4)_2 \cdot 6H_2O$ (Guangzhou Xilong Fine Chemical Technology Co., Ltd.), L-ascorbic acid (Amresco), α-ketoglutaric acid, 3M sodium acetate (free of RNA enzyme, Amresco), glycogen (Thermo), nuclease P1 (Wako Corporation, Shrimp Alkaline Phosphatase rSAP (NEB). FTO enzyme was expressed and purified by conventional molecular biology method.

(2) Experimental Apparatus

Oligonucleotide solid-phase synthesizer (Expedite), MALDI-TOF-MS (Bruker), HPLC-QQQ-MS/MS (AB-SE-ICX 5500)

(3) Experiment Steps

Taking synthesis of oligo RNA as an example, using phosphoramidite salts of $m^6A$ and A, U, C and G nucleosides as raw materials, RNA with $m^6A$ modification at 5' end (sequence 5'-$m^6$ACUGACUAG-3', also known as 9mer oligo RNA or 9 nucleotide oligo RNA) were synthesized in DMT-ON mode by using DNA automatic synthesizer, and 5' end and 3' end were protected by thiol groups. After synthesis, oligo RNA was deprotected and purified according to the standard experimental scheme provided by Glen Research, and 50-100 ng was taken to MALDI-TOF-MS for molecular weight measurement.

After obtaining 9mer oligo RNA (9 nucleotide oligo RNA) with $m^6A$ modification at 5' end, oligo RNA was demethylated by FTO in the experiment, and most $m^6A$ bases on 5' end were converted into $hm^6A$ bases. Experiment system was as shown in Table 2 (see Fu, et.al., 2013)).

TABLE 2

Demethylation reaction system of oligonucleotide containing $N^6$-hydroxymethyl adenine

| component | concentration of stock solutio | final concentration | added volume (μL) |
|---|---|---|---|
| $(NH_4)_2Fe(SO_4)_2 \cdot 6H_2O$ | 28.3 mM | 300 μM | 39.7 |
| L-ascorbic acid | 200 mM | 2 mM | 150 |
| α-ketoglutaric acid | 65 mM | 300 μM | 69.2 |
| MES pH = 7.0 | 1M | 50 mM | 750 |
| 9mer oligo RNA | 782 μM | 5 μM | 96 |
| FTO | 706 μM | 2.5 μM | 53 |
| DEPC-treated water | | | 13840 |
| total volume | | | 15 ml |

The reaction was stopped by EDTA, and a final concentration was 5 mM EDTA. Then 1/10 volume of 3M sodium acetate (150 μL) and 400 μL glycogen were added to the system. After mixing, three times volume of absolute ethyl alcohol (45 ml) that was precooled in a refrigerator at −80° C. was added to precipitate RNA, which was settled over night at −80° C. after mixing.

The system settled over night was centrifuged for 30 min in 13000 rpm or maximum rotate speed to obtain RNA precipitation, which was washed with 100% ethanol once and dry in the air for 5 min at room temperature. Then 100 μL DEPC-treated water was used to dissolve RNA, and Nanodrop spectrophotometer was used to measure a concentration of retrieved RNA.

1 nmol RNA (about 3 μg) treated by FTO was taken to react with 200 mM DTT or β-ME. The reaction system contained 100 mM HEPES with pH=4 and the total volume was 100 μL. It reacted for 3 h on a thermomixer in 1000 rpm at 37° C., and sodium acetate a and glycogen were added for mixing, after which three times volume of ethanol was used for precipitation at a refrigerator at −80° C. for at least 2 h.

50 μl water was used to dissolve retrieved oligo RNA after reaction and precipitation, and oligo RNA treated by FTO but not reacted with thiol compounds, 200-400 ng of which was taken for identification of molecular weight by MALDI-TOF-MS. Then 1.5-2 μg was added to 1 U nuclease P1, followed by digestion for 15 min at 37° C. and then analysis by HPLC for composition of products and proportions thereof. In addition, 200 ng products were taken for digestion by nuclease for 3 h, and rSAP was used to digestion for 3 h (fully digested to single nucleoside), followed by a detection by HPLC-QQQ-MS/MS detection to determine the molecular weight of the products.

(4) Experiment Results

MALDI-TOF-MS results showed that before FTO treatment, the m/z of nucleic acid chain containing $m^6A$ was 2884. After FTO treatment, three new products that m/z=2870 (−12 Da, A), 2882 (−2 Da, N6-imidized adenosine, which was a dehydrated product of $hm^6A$ after ionization) and 2898 (+28 Da, $f^6A$) appeared. After reacting with β-ME again, a peak of 2882 (N6-imidized adenosine) disappeared, and new products with m/z being 2960 (+76 Da) appeared, whose molecular weight was just consistent with molecular weight of reaction products of hm$^6$A and β-ME. Unfortunately, a peak of expected molecular weight was not observed in MALDI results after the reaction of DTT and nucleic acid chains containing hm$^6$A. However, it was noticed that after the reaction with DTT, even signals of nucleic acid chains containing A after degradation of hm$^6$A were weak (data were not shown), and thus it is guessed that the products generated by the reaction of DTT and nucleic acid chains containing hm$^6$A might restrain a ionization process of MALDI, or the products were readily broken into smaller fragments during the ionization process, hindering the detection of expected products. HPLC was used to detect the reaction products more quantificationally.

Figure 10:
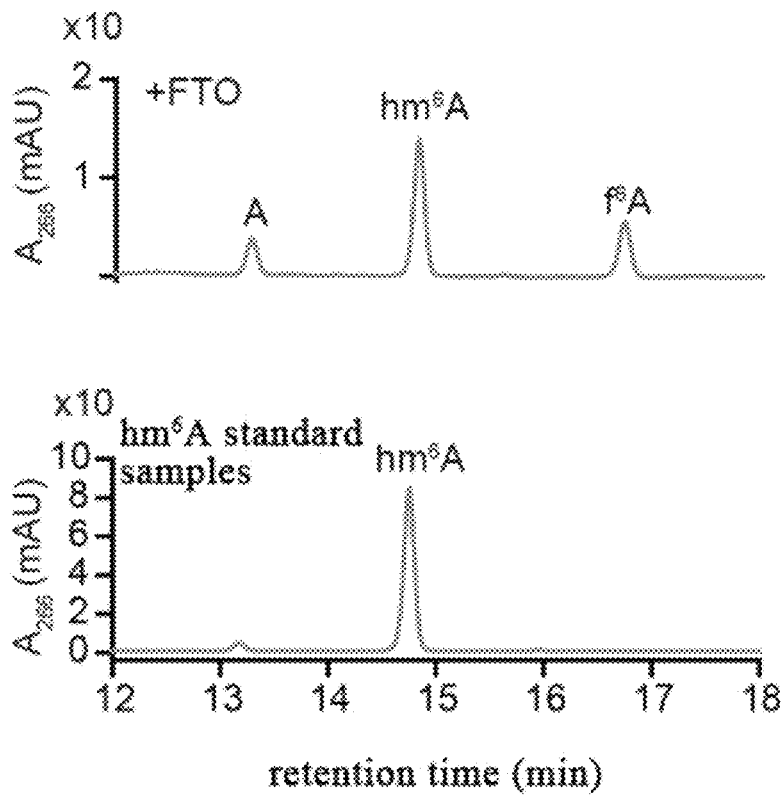
FIG. 10 shows FTO can oxidize m$^6$A on oligo RNA to hm$^6$A.

Nucleic acid chains with m$^6$A modification at 5' end were firstly treated by FTO, and digested by nuclease P1. Its first nucleoside at 5' end was characterized by HPLC. UV absorption channel of HPLC showed that after treatment of FTO enzyme, about 76% m$^6$A was converted into hm$^6$A, and additionally, further oxidized product f$^6$A was produced, which was consistent with what documents reported (FIG. 10).

Figure 11:
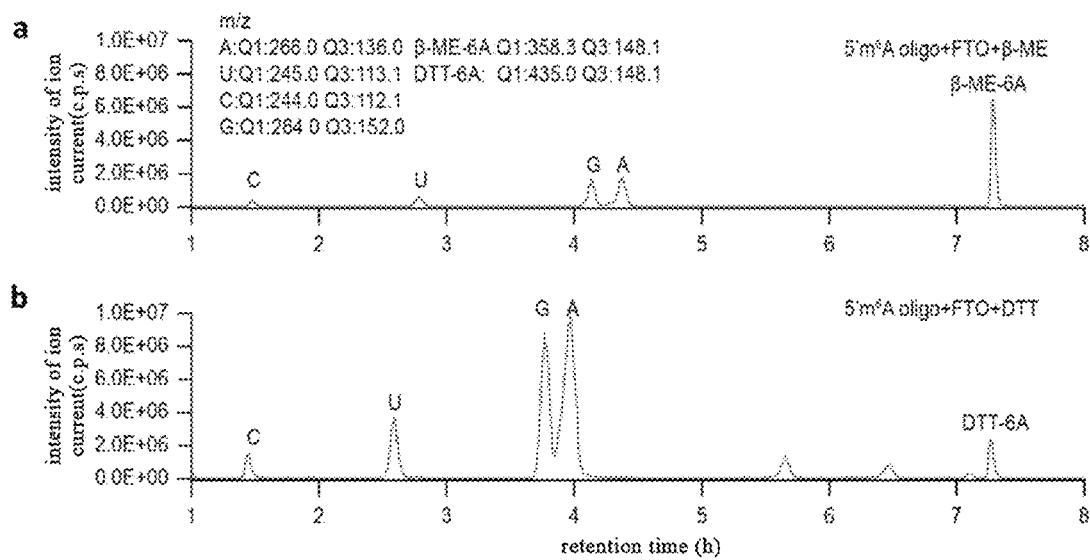
FIG. 11 shows hm$^6$A on oligo that is produced by oxidation from m$^6$A can react with β-ME and DTT to produce expected products (HPLC-MS/MS characteristic); wherein, a is HPLC-MS/MS characteristic of products obtained by reacting hm$^6$A on oligo that is produced by oxidation from m$^6$A with β-ME; b is HPLC-MS/MS characteristic of products obtained by reacting hm$^6$A on oligo that is produced by oxidation from m$^6$A with DTT.

In order to further identify products identity, liquid chromatography—triple quadrupole mass spectrometer (HPLC-QQQMS/MS) was used to identify the molecular weight of the products and fragment ions. HPLC-QQQ-MS/MS did not set a UV detection channel, but a photoelectric detector to detect intensity of a particle flow of fragment ions to report a content thereof. Monitoring mode was set as multiple reaction monitoring (MRM), which enabled to simultaneously monitor parent ions (Q1) and fragment ions (Q3) with designated m/z. Therefore, only molecular fragments whose ion pairs met the designated m/z could reach the photoelectric detector and be reported, which greatly enhanced the credibility. Because the m/z of DTT-6-A and β-ME-6-A nucleotide fragments was determined by HPLC-QQQ-MS/MS, in MRM mode, ion pairs for monitoring DTT-6-A were set as 435.0/148.1, and for monitoring β-ME-6-A were set as 358.3/148.1. As a result, whether the nucleic acid chains containing hm$^6$A reacted with DTT or with β-ME, signals of an ion current of corresponding desired products could be observed (FIG. 11). This further proved that the reaction of hm$^6$A with DTT or β-ME on nucleic acid chains was indeed corresponding substitution product.

Example 6 N$^6$-Methyladenine on Poly(A)$^+$RNA Labeled by a Thiol Compound (1) Experiment Materials and Agents HEK293T cell line (ATCC), DMEM (Dulbecco's modified Eagle's medium) medium (Life), fetal bovine serum (FBS) (Cellmax), penicillin and streptomycin double antibody (Corning), PBS buffer salt solution (Corning), Magzol (Magen), trichloromethane (analytically pure, Tongguang)), isopropanol (analytically pure, Tongguang)

Rice seed (Nipponbare), Kimura B nutrient solution (0.18 mM (NH$_4$)$_2$SO$_4$, 0.27 mM MgSO$_4$·7H$_2$O, 0.09 mM KNO$_3$, 0.18 mM Ca(NO$_3$)$_2$·4H$_2$O, 0.09 mM KH$_2$PO$_4$, 20 μM NaE-DTA-Fe·3H$_2$O, 6.7 μM MnCl$_2$·4H$_2$O, 9.4 μM H$_3$BO$_3$, 0.015 μM (NH$_4$)6Mo$_7$O$_{24}$·4H$_2$O, 0.15 μM ZnSO$_4$·7H$_2$O, 0.16 μM CuSO$_4$·5H$_2$O)

Oligo-dT magnetic beads (Invitrogen), restructuring Histag-FTO protein, NEBNext® RNAfragmentation buffer (NEB), NEBNext RNA fragmentation stop buffer (NEB), mRNA binding buffer (20 mM Tris-HCl, pH 7.5, 1.0 M LiCl, 2 mM EDTA)

Poly(A)$^+$RNA washing buffer (10 mM Tris-HCl, pH 7.5, 0.15 M LiCl, 1 mM EDTA)

Oligo-dT magnetic beads reconditioning solution (0.1 M NaOH)

Oligo-dT magnetic beads storage buffer (250 mM Tris-HCl, pH 7.5, 20 mM EDTA, 0.1% Tween-20)

(2) Experimental Apparatus

Cell incubator (Thermo), Thermomixer (Eppendorf), artificial climate incubator (Ningbo SAFE)

(3) Experiment Steps

1) Incubation of Hela Cells

Cervical cancer cell line Hela was incubated in DMEM medium containing 10% fetal bovine serum in a cell culture dish with a diameter of 15 cm at 37° C. and 5% CO$_2$. It was from one generation to the next every 24-48 h.

2) Culture of Rice

Rice (Nipponbare) seed was immersed in water for 2 days (30° C.). Then its seedling was moved to an artificial climate incubator and cultured with Kiruma B nutrient solution using hydroponics. A cycle of light/dark treatment in an incubator was 16 h/8 h, the temperature was 38° C. and humidity was 80%. Rice leaves were collected after 15 days, quick freezed by liquid nitrogen and ground by a sample grinder, and RNA was extracted from tissue powder with TRIzol.

3) Total RNA Extraction of Cells

Total RNA extraction: culture medium was removed when a density of cells was 80-90%, and the cells were washed with 10 ml PBS. After removing PBS, 6 ml Magzol was added to every dish with 15 cm diameter, lysed for 3 min, and a lysate was moved to 15 ml Corning tube. 1.2 ml trichloromethane was added into the tube, vortexed for 1 min and settled for 1 min, centrifuged for 10 min in 13,000 rpm or maximum rotate speed and finally its supernatant was transferred to a new tube (avoided to suck into a interlayer). 3 ml isopropanol was added to the tube for mixing, settling for 10 min and centrifuging for 10 min in 13,000 rpm or maximum rotate speed. The supernatant was removed to obtain a precipitate, which was washed with 75% ethanol, dried in the air, and dissolved in DEPC-treated water, and then RNA concentration was measured by using Nanodrop microultraviolet-visible spectrophotometer.

3) Total RNA Extraction of Rice 1 g rice powder (with a volume about 2.5 mL) corresponded to 10 mL Magzol reagent, and subsequent steps of extracting total RNA were the same with the steps of extracting RNA from cells.

4) Extraction of Poly(A)$^+$RNA

Around 4 mg oligo dT magnetic beads (800 μL) were required for extracting Poly(A)$^+$RNA from every 300 μg total RNA. Firstly, 4 mg magnetic beads were placed on a magnet, washed with 400 μL binding buffer once after removing a supernatant, and taken from the magnet after placed on the magnet and removing the supernatant. Then 400 μL binding buffer was added to resuspension for subsequent use. The extracted Hela total RNA was diluted to 750 ng/μL, 400 μL (300 μg) of which was taken to mix with 400 μL binding buffer, heated for 2 min at 65° C. and quickly placed on the ice to remove RNA secondary structure. A mixture of 800 μL RNA and buffer was added to 400 μL magnetic beads, rotated and incubated for 30 min, placed on the magnet, and washed with 800μL washing buffer for 3 times after the supernatant was removed. Then 80 μL DEPC-treated water was added, followed by heating for 2 min at 75° C. to elutePoly(A)$^+$RNA. In order to obtain Poly(A)$^+$RNA with higher purity, it was required to incubate again with Oligo dT magnetic beads to purify: 400 μL binding buffer was added to eluted mRNA, rotated and incubated for 30 min at 4° C., placed on the magnet, and washed with 800 µL washing buffer for 3 times after the supernatant was removed. Then 80 µL DEPC water was added, followed by heating for 2 min at 75° C. to elute Poly(A)+RNA. Subsequently Qubit fluorescence ration PCR instrument was used to measure a yield of Poly(A)+RNA. The yield was around 1-2%.

5) Demethylation Reaction of Poly(A)+RNA

Conditions of the demethylation reaction of Poly(A)+RNA were basically the same with conditions of the demethylation reaction of oligo nucleic acid chains. Because actual mRNA had secondary structure and a low content of $m^6A$, demethylation activities of FTO to it was lower than demethylation activities to $m^6A$ on the oligo nucleic acid chains. In order to convert $m^6A$ on Poly(A)+RNA to $hm^6A$ as much as possible, a few changes were made to the reaction conditions: Fe II concentration was increased from 75 µM to 300 µM, and its reaction time was still 5 min, while a molar ratio of FTO and $m^6A$ in nucleic acid was increased to 20: 1. 5 mM EDTA was added after the reaction to stop, ¹⁄₁₀V of 3M sodium acetate and 5 µL glycogen were added for mixing, and three volume of ethanol was added to precipitate for at least 2 h at −80° C. to obtain a precipitate. 500 ng precipitate was taken to react with DTT or β-ME for 3 h, and precipitated with ethanol to retrieve RNA. 100 ng retrieved RNA was taken and subjected to double digestion by nuclease P1 and rSAP, which was identified by HPLC-QQQ-MS/MS.

(4) Experiment Results

Figure 12:
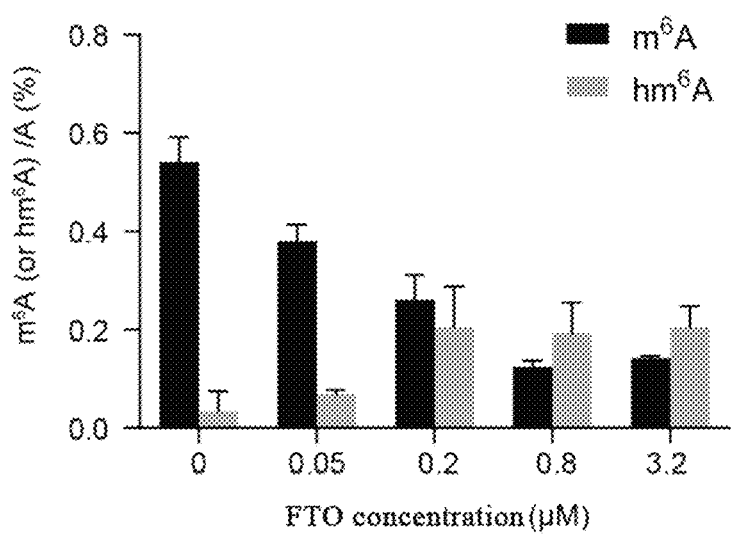
FIG. 12 shows an influence of FTO concentration on a yield of hm$^6$A.
Figure 13:
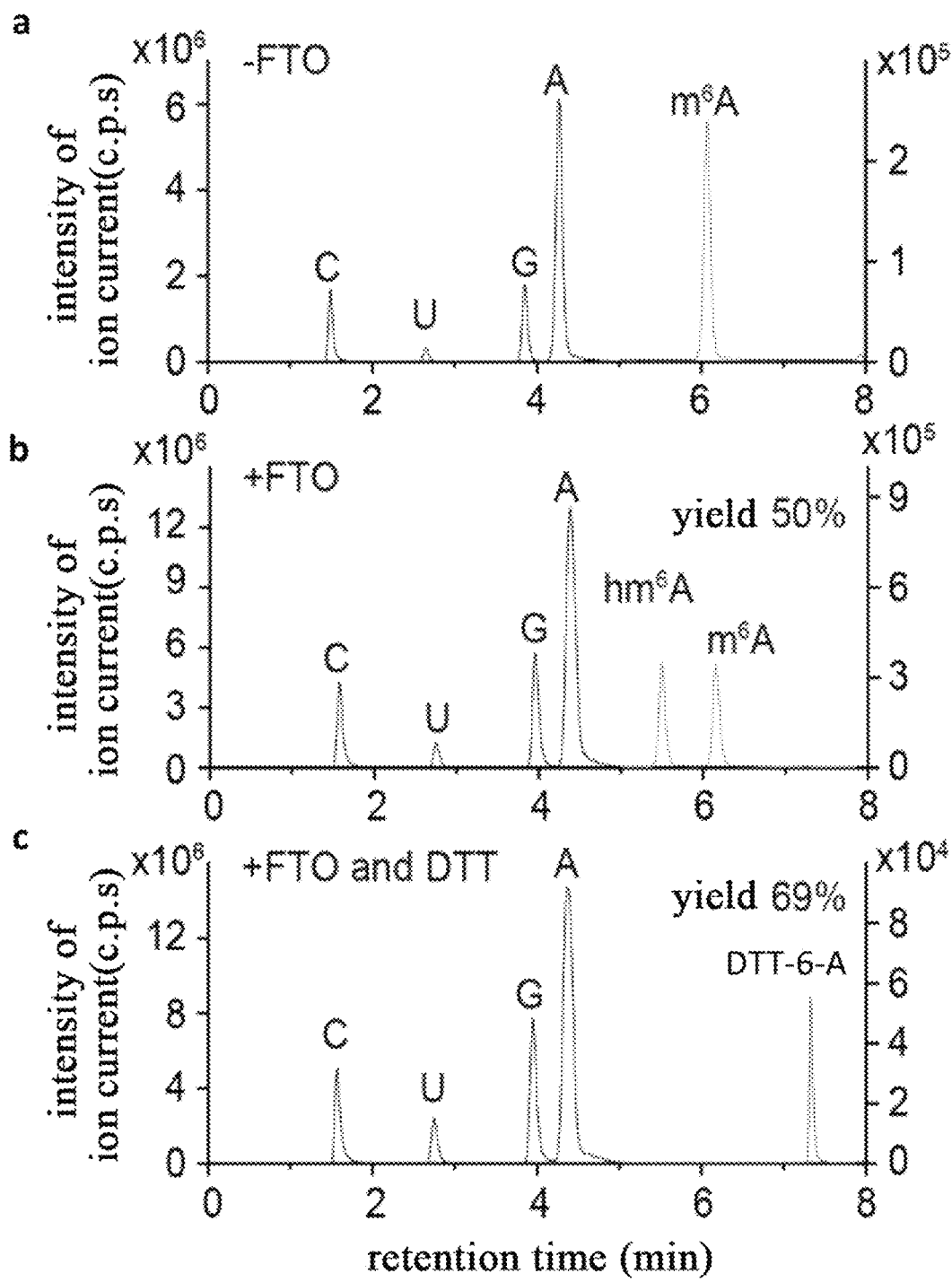
FIG. 13 shows FTO can convert m$^6$A on human HEK293T cell poly(A)$^+$RNA to hm$^6$A.

In a 300 µL oxidation reaction system (300 µM $(NH_4)_2Fe(SO_4)_2 \cdot 6H_2O$, 2 mM L-ascorbic acid, 300 µM α-ketoglutaric acid, 100 mM pH7.0 HEPES buffer salt solution), when FTO concentration was 0.2 µM and substrate RNA was 900 ng, the reaction was carried out for 5 min, which enabled to obtain the maximum yield (50%) (FIG. 12). After reacting with FTO, a significant decrease of original ion signals of $m^6A$ on Poly(A)+RNA was observed, and signals of $hm^6A$ appeared (FIG. 13b). After $hm^6A$ of Poly(A)+RNA further reacting with DTT or β-ME, the signals of $hm^6A$ disappeared, and corresponding signals of corresponding product DTT-6-A appeared (FIG. 13c). This indicated that $m^6A$ on Poly(A)+RNA could be converted into $hm^6A$, and could further react with thiol compounds to produce the corresponding product.

Example 7 $N^6$-Methyladenine on Poly(A)+RNA Labeled with Biotin (1) Experiment Materials MTSEA-biotin-XX (Biotum), HEPES buffer salt solution (1M, pH=7.5, solution formed with DEPC-treated water), EDTA (500 mM DEPC solution), DMF, DTT-labeled Poly(A)+RNA, Immobilon-Ny+ positively charged nylon roll film, 0.45 µm (Millipore), BSA(Amresco), HRP (Invitrogen) coupled with streptavidin, PBST (solution formed with PBS buffer and DEPC-treated water, plus 0.1% Tween-20), Immobilon developer (Millipore)

(2) Experimental Apparatus

Thermomixer (Eppendorf), automatic chemical bioluminescence imaging analytic system (Tanon 5200)

(3) Experiment Steps

1) Biotin Baleling

3 µg Poly(A)+RNA treated by FTO and reacted with DTT was taken to react with MTSEA-biotin-XX, and its system was as shown in Table 3:

TABLE 3

Biotin baleling system of Poly(A)+RNA

| component | concentration of stock solution | final concentration | added volume (µL) |
|---|---|---|---|
| MTSEA-biotin-XX | 20 mM (DMSO solution) | 100 µM | 1 |
| HEPES (pH 7.5) | 1M | 100 mM | 2 |
| EDTA | 500 mM | 1 mM | 0.8 |
| DMF | — | — | 40 |
| DTT-tagged mRNA | — | — | 20 |
| DEPC-treated water | — | — | 136.2 |
| total volume | | | 200 |

The reaction was carried out on the thermomixer in 1200 rpm at 25° C. away from light for 1 h and the precipitation was carried out with ethanol at −80° C.

2) Dot-Blot Detection of Biotin Labeling

RNA was diluted to designated concentration, denaturated for 2 min at 95° C., and quickly placed on the ice to quench, 3 µl of which was taken to point to the nylon film, cross-linked in a UV-light cross-adaptor after fully drying in the air. UV lamp with a wavelength of 254 nm, energy of 1500 J was selected to crosslink for two times. The film was blocked with 1% BSA (dissolved in PBST) for 1 h, washed with PBST for three times (5 min for each time), applied with 10 ml antibody solution (antibiotin-HRP, dissolved in PBST in 1:10,000), incubated for 1 h and washed with PBST for four times (5 min for each time) to develop.

(4) Experiment Results

Figure 14:
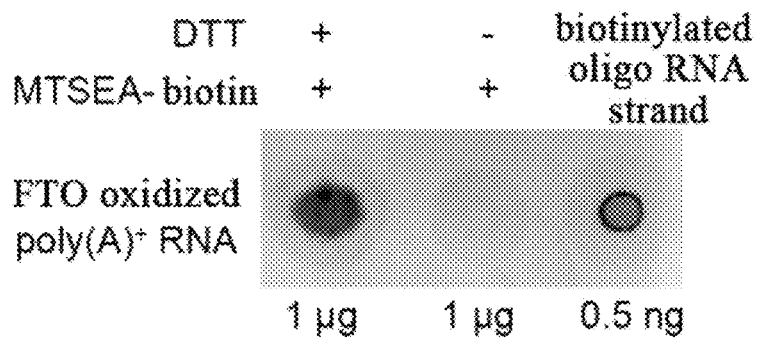
FIG. 14 shows Dot-blot verifies biotin labeling on human HEK293T cell poly(A)$^+$RNA.

1 µg biotin-labeled Poly(A)+RNA was taken for Dot-blot assay. After RNA that was treated by FTO and reacted with DTT was reacted with MTSEA-biotin-XX, spots appeared in Dot-blot, which indicated that it was labeled with biotin. However, after RNA that was only reacted with FTO but not treated by DTT was reacted with MTSEA-biotin-XX, no spot appeared in Dot-blot, which indicated that it could not be labeled with biotin (FIG. 14). On the one hand, the invention showed that our strategy could achieve the biotin labeling to actual RNA containing $m^6A$, and on the other hand, it also showed that this labeling was specific, because RNA that acted as a negative control and was not reacted with DTT could not be labeled with biotin. It was proved that the method of the invention had a potential of being used in the enrichment and high-throughput sequencing of RNA containing $m^6A$.

Example 8 Enrichment and Library Construction of Biotin-Labeled Fragments on Poly(A)+RNA (1) Experiment Materials Biotin-labeled fragmented Poly(A)+RNA that was oxidized by FTO and reacted with DTT, Dynabeads™ MyOne™ streptavidin C1(Invitrogen), NEBNext© Ultra™ II RNA Library Prep Kit for Illumina®.

RNA removal buffer: NaOH (0.1M), NaCl(50 mM)

High-salt washing buffer: Tris-HCl (pH=7.5, 100 mM), EDTA(10 mM), NaCl(1M), Tween 20 (0.05%)

Magnetic beads block buffer: high-salt washing buffer pluses glycogen (final concentration: 40 µg/ml)

Eluting buffer (freshly prepared): DTT (100 mM), HEPES (pH=7.4, 20 mM), EDTA (1 mM), NaCl (100 mM), Tween 20 (0.05%)

(2) Experimental Apparatus
Thermomixer (Eppendorf), rotating mixer (Crystal)
(3) Experiment Steps
1) Removal of RNase on magnetic beads: 100 μL C1 magnetic beads were taken and resuspended with 200 μL RNase removal buffer after removing the supernatant and settled for 2 min at room temperature. 200 μL RNase removal buffer was used again to wash, and the operation of 1) was repeated.
2) Block of C1 magnetic beads: 200 μL magnetic beads block buffer was used to wash after removing the supernatant. 500 μL magnetic beads block buffer was added and it was incubated for 1 h at room temperature, which was washed with 200 μL DEPC-treated water. Then 100 μL DEPC-treated water of 10 μL high-salt washing buffer was used to resuspend the magnetic beads.
3) Incubation: RNA was dissolved in 100 μL water, which was added with 10 μL high-salt washing buffer, mixed with 110 μL magnetic beads, and incubated for 1 h away from light at room temperature.
4) Washing: The magnetic beads were placed on the magnet, and the supernatant was collected as Flow through, which was cryopreserved. The magnetic beads were washed with 500 μL high-salt washing buffer.
5) Elution: The magnetic beads were resuspended by 100 μL elution buffer, placed on the thermomixer, mixed for 15 min at room temperature and moved to the magnet for the collection of supernatant. Subsequently, 100 μL eluting buffer was used again for elution, followed by the mixing for 5 min at 50° C., and the products of the second elution were collected.
6) Recycling of RNA: 5 μL glycogen and ⅒V of 3M NaAc were added to the products eluted for 2 times, mixed and added with 3 times volume of ethanol for the precipitation over night at −80° C.
7) Retrieved RNA (5 ng) and input RNA (5 ng) were taken for the library construction by NEBNext® Ultra™ II RNA Library Prep Kit for Illumina®, whose steps were the same as the description of the kit. Finally, PCR amplified DNA used 14 cycles, and PCR products were recovered twice with 0.8×DNA clean up beads. 10-20 ng was used for the high-throughput sequencing.

(4) Experiment Results

After fragmenting Poly(A)$^+$RNA to 100-200 nt, it was demethylated by FTO. The reaction time was control for 5 min to convert m$^6$A into hm$^6$A. After that, ethanol was used to precipitate and retrieve RNA, which was than reacted with DTT. After the reaction, ethanol was used to precipitate and retrieve reaction products, which was then reacted with MTSEA- biotin -XX to complete biotin labeling. A small amount of RNA was left as the Input group, and the rest RNA was incubated with streptavidin magnetic beads. After incubation, the non-specific binding RNA fragments on the magnetic beads were washed away, and then DTT was used to release the enriched RNA fragments from the magnetic beads. After ethanol precipitation, the concentration was measured, and the library construction was carried out by using these enriched target RNA.

Poly(A)$^+$RNA with different initial amount (10 μg, 5 μg, 2 μg, 1 μg, 500 ng, 200 ng, 50 ng) were tested to explore the lower limit of Poly(A)$^+$RNA amount needed for library construction. Furthermore, it was also explored that in an enrichment experiment whether streptavidin magnetic beads could fully enrich biotin-labeled fragments. The method comprised that a relatively large amount of initiator mRNA (about 50 μg) was treated by FTO, reacted with DTT, labeled with biotin and enriched. After collecting the enriched RNA, the Flow through was incubated with streptavidin, wherein the residual biotin fragments were enriched. RNA enriched twice was subjected to library construction and high-throughput sequencing, and the completeness of enrichment in one experiment was analyzed from the sequencing results.

Figure 15:
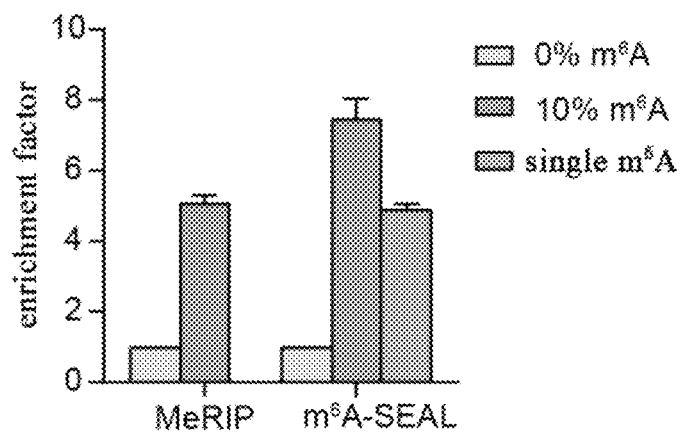
FIG. 15 shows an enrichment degree of Spike in RNA sequence.
Figure 16:
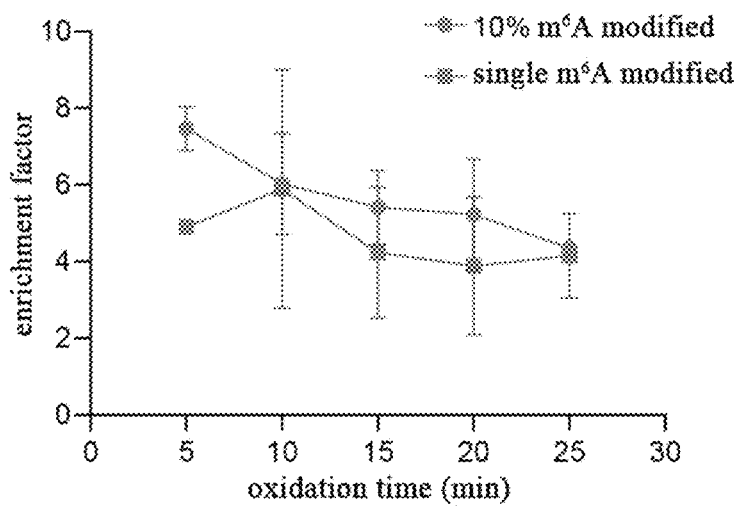
FIG. 16 shows an influence of FTO oxidation time on an enrichment degree of Spike in RNA sequence.

In order to access the enrichment rate of the method of the invention quantificationally, RNA containing a certain proportion of m$^6$A and containing no m$^6$A was transcribe in vitro as spike-in: 10% m$^6$A Cp-3 (10% m$^6$A, corresponding DNA template sequence was as shown in SEQ ID NO: 1); unmodified Cp-2 (0% m$^6$A, corresponding DNA template sequence was as shown in SEQ ID NO: 2); single m$^6$A modification (single m$^6$A, corresponding DNA template sequence was as shown in EQ ID NO: 3). Results showed that spike-in with m$^6$A modification had 5-12 fold enrichment over spike-in without m$^6$A modification. It was necessary to mention that even there was only one m$^6$A modification on spike-in sequence, there was a 5-fold enrichment, which indicated that the enrichment of RNA with m$^6$A modification by the method of the present invention was successful (FIG. 15).

Because FTO oxidation time influenced the ratio of hm$^6$A and f$^6$A in the products, in order to explore that most suitable oxidation time for sequencing, the products that were oxidized by FTO for 5, 10, 15, 20 and 25 minutes were subjected to library construction and the degree of enrichment of spike-in sequence was counted to determine the optimum oxidation time. The sequencing results showed that the degree of enrichment of spike-in sequence gradually decreased after oxidation for 5 min by FTO. This was consistent with the maximum conversion from m$^6$A to hm$^6$A at 5 min reported in the literature.

Example 9 Sequencing Based on m$^6$A Selective Chemical Modification

1. Data Processing Method
(1) Removing Sequencing Data Adaptor
(1.1) Software Needed: Cutadapt (v1.18)
(1.2) Processing Method
A mode of removing paired-ended adaptors was adopted, and the command line was as follows:
cutadapt -a ADAPTER_R1 -A ADAPTER_R2 -o trimmed.reads.R1.fastq -p trimmed.reads.R2. fastq reads.R1.fastq reads.R2.fastq
wherein, ADAPTER_R1 was a reverse complement of adaptor at 3' end; ADAPTER_R2 was a reverse complement of adaptor at 5'end; trimmed.reads.R1.fastq was a input document of the sequencing results removed the adaptor at 3'end; trimmed.reads.R2.fastq was a input document of the sequencing results removed the adaptor at 5'end; reads.R1.fastq was the sequencing result of 3'end; reads.R2.fastq was the sequencing result of 5'end.
(2) Sequencing Data Aligned to Human Genome
(2.1) Software Needed: hisat2 (v2.1.0) Samtools (v1.7)
(2.2) Processing Method
Paired-ended alignment mode of hisat2 was used. After the alignment, an obtained sam file was converted to bam file by samtools, and then subjected to sort, after which the obtained file could be opened by IGV genome viewer for direct visualized analysis. Command line was as follows:
hisat2 -x index_reference_genome-1 trimmed.reads.R1.fastq -2 trimmed.reads.R2. fastq -S output.sam
use hisat2 alignment samtools view -bS output.sam >output.bam
use samtools to convert a samfile to a bam file
samtools view sort -o output.sorted.bam output.bam
use samtools to input a bam file to a new file (.sorted.bam) after sort (3) Analysis of Enrichment Sites in Sequencing Data The software MACS2 was used to analyze the enrichment sites, and the command line was as follows:

macs2 callpeak --nomodel --slocal 200 -t sample.IP.sorted.bam -c sample.input.sorted.bam -f BAM -g 3e9 -n sample.m6A -B -q 0.01
In the obtained output folder, .xls file was the chromosome number and genome start-stop coordinates of the enrichment site., and the .summits.bed file was the coordinate of the enrichment peak.

(4) Parallel Analysis of Biological Replicates

The first three columns of the .xls file output by MACS2 (excluding a comment line and description information at the beginning of the file) was pasted into a new text file, saved as .bed format, and use analyzed by the software bedtools for the overlap of enrichment sites of parallel biological samples. The command line was as follows:

intersecBed -a sample.m6A.1.bed -b sample.m6A.2.bed>sample.1.2.m6A.overlap.bed
The obtained output file was the sites that overlapped with those in sample 1 in sample 2. Since the default mode of bedtools was used here, the overlap of one base between different sites was defined as coincidence. After obtaining the output file, the command cat sample.1.2.overlap.bed|wc −1 could be used to obtain the number of overlapping sites.

(5) Analysis of Conserved Sequences in Sequencing Results

The software HOMER was used to find and analyze the conserved sequences in sequencing results. Command line was as follows:

findMotifsGenome.pl sample.m6A.bed hg38 MotifOutput -rna -len 5, 6, 7
MotifOutput folder is the name of the output folder, and the webpage link given by .html file in this folder would show the conservative sequence, the enriched P value and their respective proportions in the reads of the input group and the IP group.

(6) Distribution of Enrichment Sites in Different Regions of Transcripts in Sequencing Results The distribution of enrichment sites in different regions of transcripts was drawn by R package Guitar. The brief process was as follows: firstly the human genome annotation file (gtf file) from Ensemble was downloaded, then makeTxDbFromGFF function was used to convert the information in a gtf file into a TxDb object, and then makeGuitarCoordsFromTxDb function was used to extract transcriptome information from TxDb object. After doing the above preparations, the system.file function was used to read the peak file (bed file, result from macs2), and then the import.bed function was used to convert it into the Granges object. Finally, according to the converted transcriptome and peaks information, the GuitarPlot function was used to draw the distribution of enrichment sites in different regions of the transcript.

2. Experiment Results (1) the Alignment Rate of Sequencing Data to the Human Genome was High After removing the adaptor from the original data, the measured sequence was aligned with the human genome by using hisat2 software, and the alignment rate was shown in Table 4:

TABLE 4

The alignment rate of the library finally obtained with different initial RNA amount

| initial RNA amount (μg) | matching ratio |
|---|---|
| 10 | 95.8% |
| 5 | 93.1% |
| 1 | 92.0% |
| 0.5 | 79.6% |
| 0.2 | 69.6% |
| 0.05 | 48.6% |

It could be seen that when the initial amount was less than 500 ng, the alignment rate significantly decreased. When it was more than 500 ng, the alignment rate was higher, achieving above 80%, which could meet the need of further analysis.

(2) the Number of $m^6A$ sites in sequencing data was consistent with the actual number of $m^6A$ Sites.

The enriched regions of the IP group over the input group in the sequencing data were calculated by the software MACS2 and defined as $m^6A$ sites found by the method of the invention. The number of sites was shown in Table 5:

TABLE 5

Different initial amounts of poly(A) + RNA and the number of $m^6A$ sites obtained

| initial RNA amount (μg) | site number |
|---|---|
| 10 | 7,320 |
| 5 | 6,699 |
| 1 | 7,509 |
| 0.5 | 8,731 |
| 0.2 | 2,754 |
| 0.05 | 482 |

It could be seen that the method of the invention could obtain 6,000-8,000 $m^6A$ sites, which was generally consistent with and slightly less than the actual number of $m^6A$ sites (about 10,000-15,000), and when the initial amount was less than 500 ng, the obtained sites was significantly reduced.

The completeness of enrichment of biotin-labeled mRNA in the first experiment was also analyzed. The sample eluted after the first enrichment of 50 μg mRNA and the sample eluted after the second enrichment in the Flow through were aligned to the human genome, and then the software MACS2 was used to find the $m^6A$ site. It was found that the number of sites obtained after the second enrichment was far less than that of the first enrichment, indicating that even when the initial amount was 50 μg, the biotin-labeled site could be completely enriched in one experiment (Table 6). Furthermore, after the first elution, there was a few residual RNA on magnetic beads. Thus, it was a better choice to combine the samples eluted in two elution.

TABLE 6

Completeness of the m⁶A-SEAL enrichment

| sample | number of sites (FDR <0.01) |
|---|---|
| Enrichment of first elution from the input group | 7,212 |
| Enrichment of second elution from the input group | 7,269 |
| Enrichment of the combination of the two elution from the Flow through | 501 |

Figure 17:
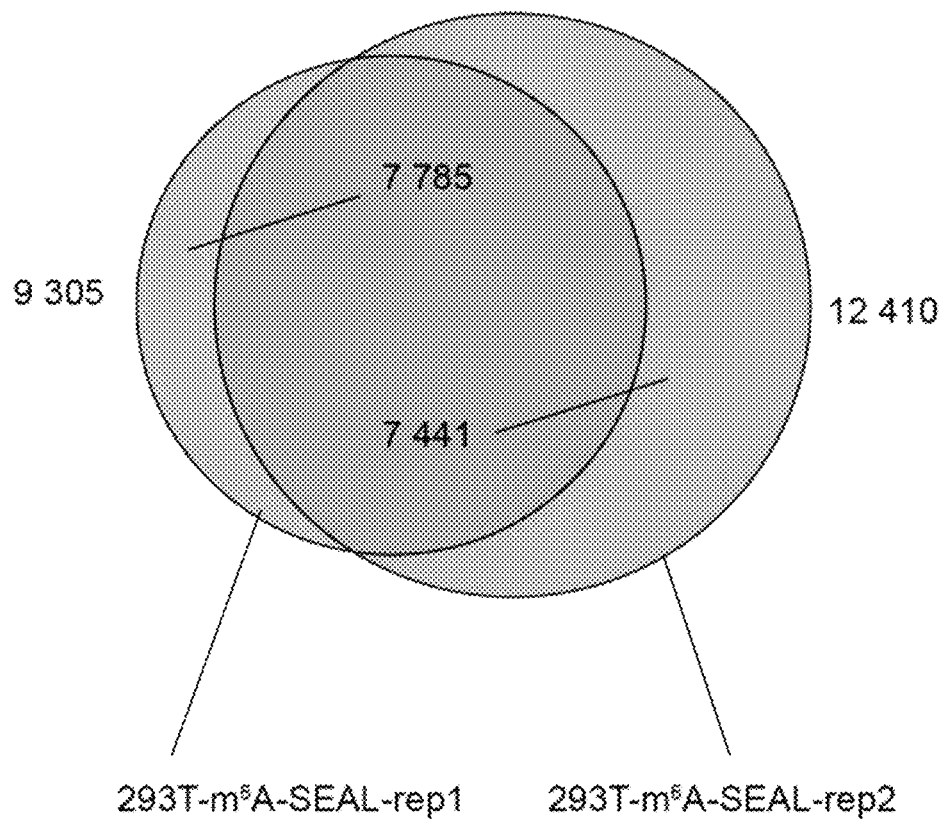
FIG. 17 shows an overlap of m$^6$A sites identified by m$^6$A-SEAL in two biological samples of human HEK293T cells.

(3) Consistence of Sequencing Data from Biological Replicates Met the Requirements of Further Analysis By analyzing the overlap of the two sets of parallel samples, it was found that there were 7785 and 7441 overlapping sites in the two samples, respectively, accounting for 83.6% of the total number of sites in the parallel sample 1 and 60% in the parallel sample 2, which met the requirements for further analysis (FIG. 17).

(4) the Enrichment Site of Human m⁶A Obtained by the Method of the Invention Presented a Conserved Motif of RRACH By analyzing the sequence characteristics of the sites in the sequencing data, it was found that the obtained sites presented the conserved motif of RRACH, which was consistent with the conserved motif of m⁶A. Its P values were all below 1060, which indicated that the method had good specificity of enrichment. When the initial amount was less than 500 ng, the conversed motif of RRACH could not be observed, indicating that the lower limit of detection by the method was around 500 ng, which corresponded to 1/10 of the initial mRNA amount in the sequencing method based on m⁶A enriched by antibodies (FIG. 42).

(5) m⁶A sites measured by the method of the invention had good overlap with reported m⁶A Sites.

Figure 18:
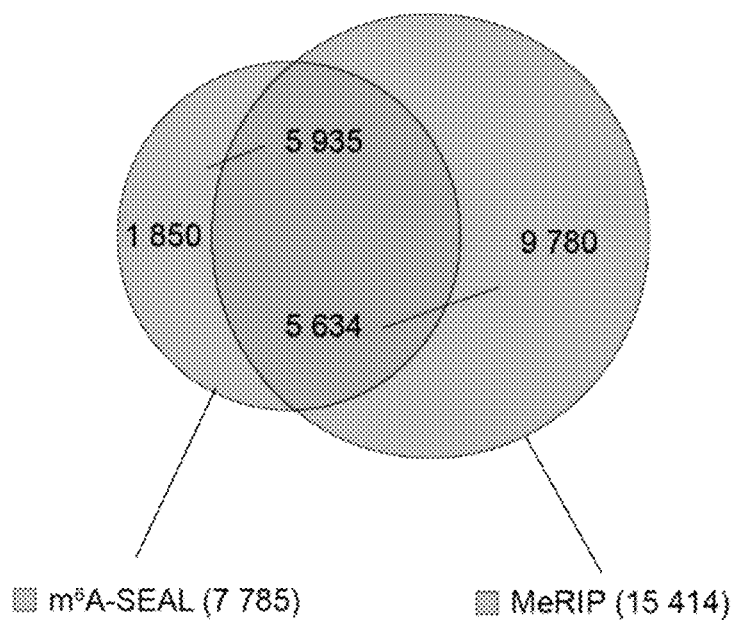
FIG. 18 shows an overlap of m$^6$A sites obtained by m$^6$A-SEAL and MeRIP-seq on human transcriptome.

By analyzing the overlap between m⁶A sites shared by two biological replicates measured by the method of the invention and m⁶A sites obtained by antibody-based method, it was found that the overlapping sites accounted for about 76% of the total sites measured by the method of the invention. Because the method of the invention avoids false positive results caused by nonspecific binding of antibodies, it was considered that these overlapping sites are highly credible m⁶A sites (FIG. 18). Because the method of the invention avoids false positive results caused by nonspecific binding of antibodies, it was considered that these overlapping sites are highly credible m⁶A sites.

Figure 19:
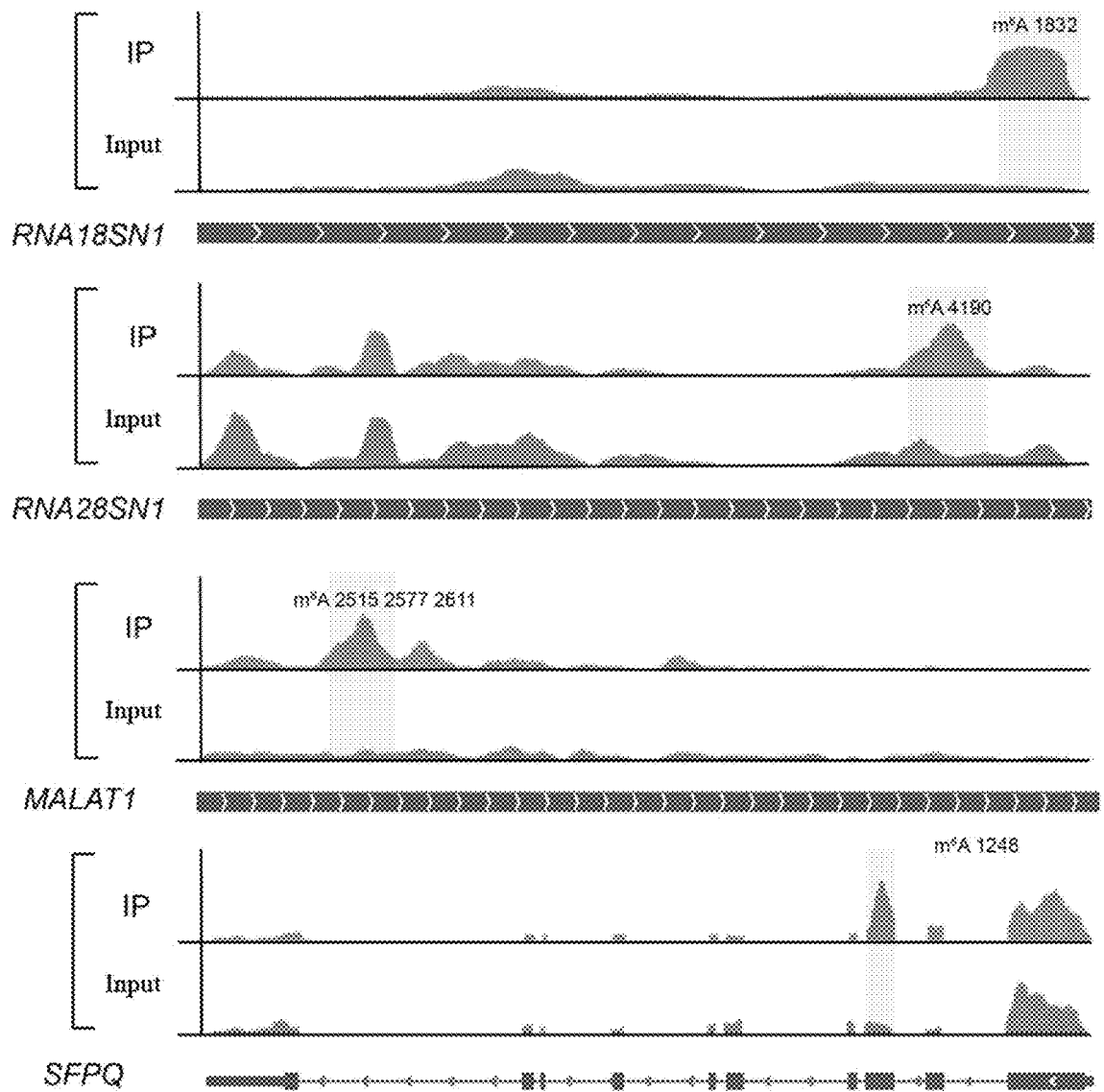
FIG. 19 shows conserved m$^6$A sites identified by m$^6$A-SEAL on transcripts.

In the IGV genome browser, compared with the reported conserved m⁶A sites, such as MALAT12525 2577 2611 m⁶A, 18s rRNA 1832 m6A, 28s rRNA 4190 m⁶A and SFPQ 1248 m6A, it was found that these sites were also identified in the sequencing method of the invention (FIG. 19), indicating that the method of the invention could successfully identify the known m⁶A sites.

(6) m⁶A Sites Measured by the Method of the Invention Significantly Enriched in the Center of Sites Obtained by the Antibody-Based Method.

Figure 20:
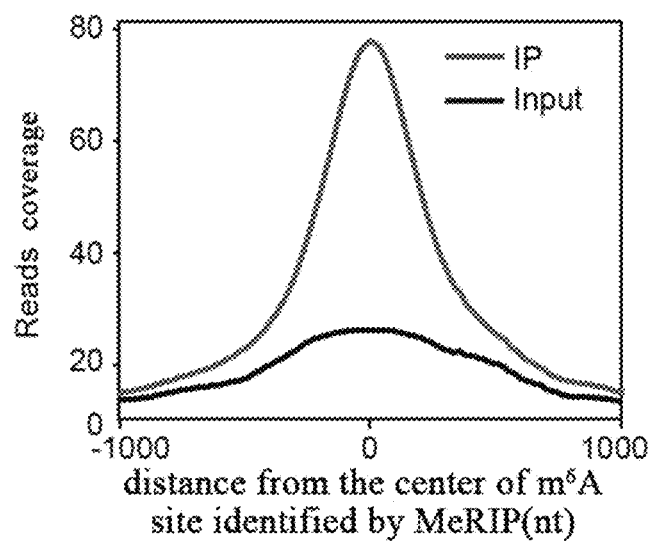
FIG. 20 shows a coverage of reads of IP and input samples obtained by m$^6$A-SEAL around the center of m$^6$A sites identified by MeRIP-seq.

The distribution map of enrichment signals obtained by m⁶A-SEAL around m⁶A sites obtained by antibody-based method was drew, so as to further compare the positional relationship of m⁶A sites obtained by the two methods more finely. Results showed that reads obtained by the IP group in m⁶A-SEAL significantly enriched in the center of the sites of the antibody-based method, while reads from the input group did not show the trend, which indicated that the sites obtained by the method of the invention were actual m⁶A sites (FIG. 20).

Figure 21:
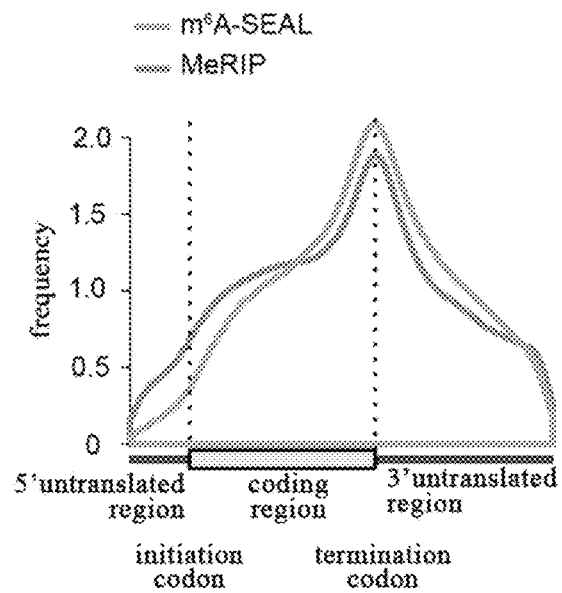
FIG. 21 shows human m$^6$A sites obtained by m$^6$A-SEAL and MeRIP-seq have same distribution characteristics on transcripts.

(7) the Distribution of m⁶A Sites on the Transcriptome Obtained by the Method of the Invention was Consistent with the Results Obtained by the Antibody-Based Method.

m⁶A was distributed in transcripts with obvious characteristics of being concentrated at 3-UTR and close to stop codon. In order to further confirm whether the sites measured by the method of the invention were m⁶A, the distribution of the sites obtained by the method of the invention on transcripts was further analyzed. The results show that the sites obtained by the method of the invention were also characterized by being concentrated at 3-UTR and close to stop codon, which was basically consistent with the distribution of m⁶A obtained by antibody-based method. It was further confirmed that the sites obtained by the method of the invention were m⁶A sites (FIG. 21).

(8) the Results Obtained by the Method of the Invention in the Analysis of Rice Epitranscriptome were Better than that of the Antibody-Based Method In recent years, researchers found that m⁶A not only played an important regulatory role in mammalian cells, but also played an important role in plant growth and development. In rice, the researchers used antibody-based method to identify the m⁶A RNA motif UGUAMM (M=A/C) which was quite different from that of mammals in plants, but it was difficult to confirm whether it is the actual m⁶A new motif or the nonspecific binding result of antibodies. Since the principle of the method of the invention was different from that of antibody-based method, it was hoped that the method of the invention could be used to confirm the results of m⁶A distribution and conserved motifs in plants.

Figure 22:
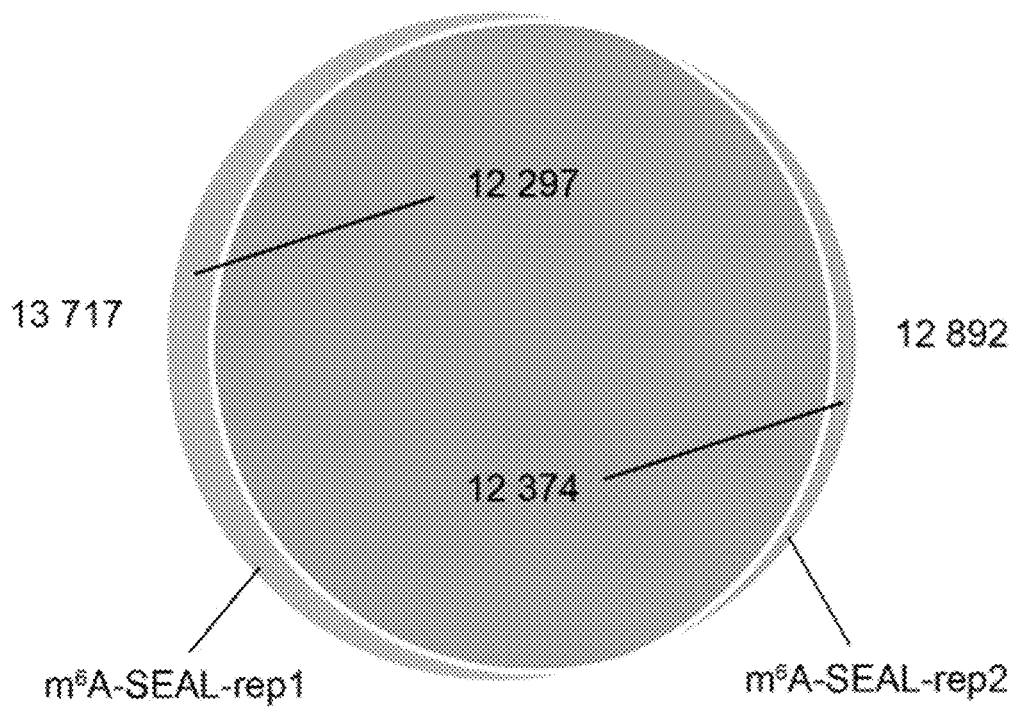
FIG. 22 shows an overlap of m$^6$A sites identified by m$^6$A-SEAL and MeRIP-seq in two biological samples of rice, wherein a is an overlap of m$^6$A sites identified by m$^6$A-SEAL in two biological samples of rice, and b is an overlap of m$^6$A sites identified by MeRIP-seq in two biological samples of rice.
Figure 22:
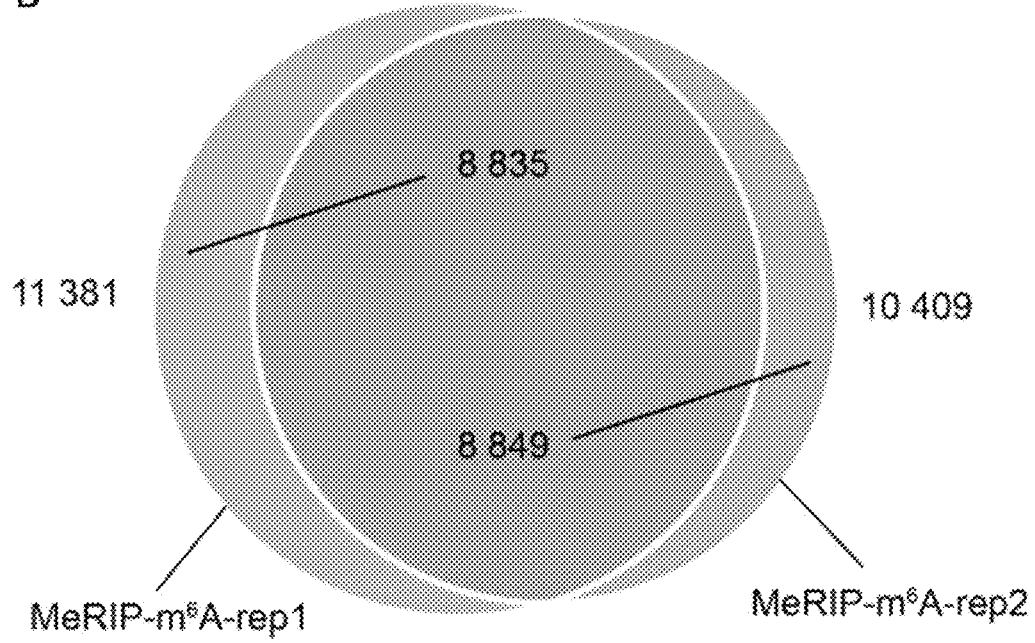

For the sake of comparison, both the method of the invention and antibody-based method were used to enrich m⁶A fragments in rice Poly(A)+RNA. At first, the consistence between biological replicate samples was compared, and it was found that the overlapping ratio between two biological replicates obtained by the method of the invention (89.6%) was greater than that of antibody-based method (77.6%). The number of obtained m⁶A sites was more (FIG. 22).

Figure 23:
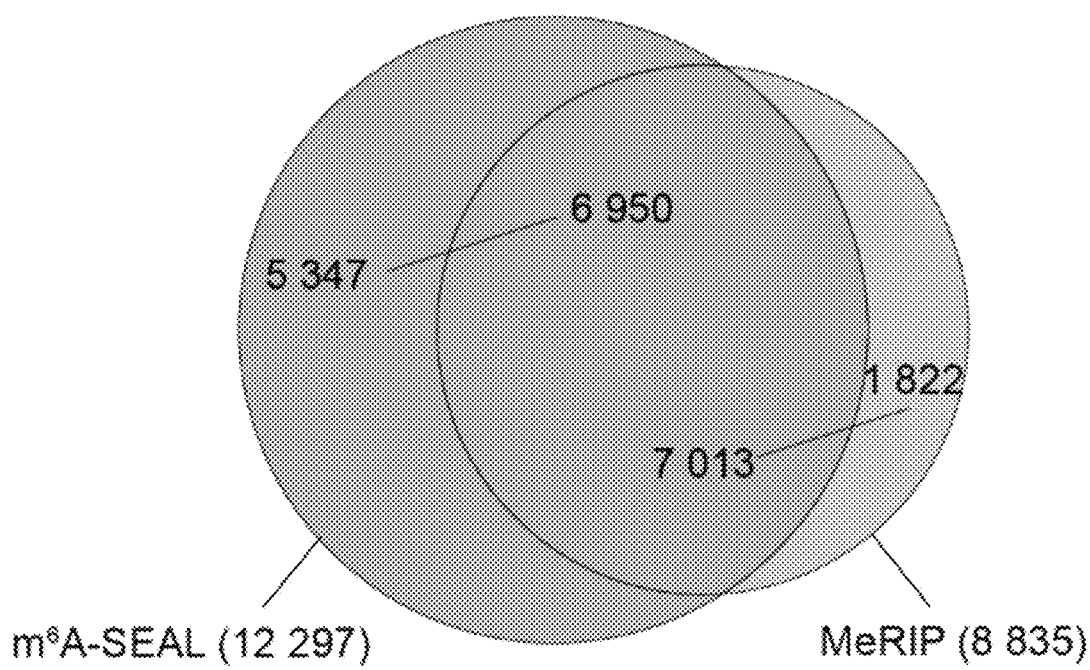
FIG. 23 shows an overlap of m$^6$A sites obtained by m$^6$A-SEAL and MeRIP-seq on rice transcriptome.

After that, the overlapping degree of m⁶A sites obtained by the method of the invention and antibody-based method was analyzed, and it was found that the overlapping sites accounted for 58.3% of m⁶A sites obtained by the method of the invention and 78.7% of m⁶A sites obtained by antibody-based method (FIG. 23).

Figure 24:
FIG. 24 shows conserved motifs of m$^6$A sites obtained by m$^6$A-SEAL and MeRIP-seq on rice transcriptome.

(9) the Enrichment Site of Rice m⁶A Obtained by the Method of the Invention Presented a Conserved Motif of UGUAMM RNA conserved motifs of m⁶A sites obtained by the method of the invention and antibody-based method were analyzed, respectively, and the results showed that conserved motif of UGUAMM could be obtained, which was also consistent with literature reports (Y. Li et al., 2014). This proved that the results of antibody-based method and indicated that the presence of nonclassical m⁶A motif in the plants (FIG. 24).

Figure 25:
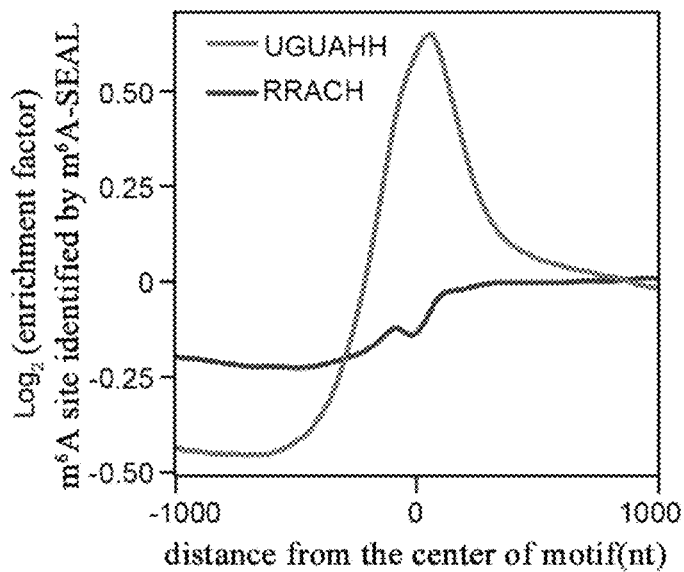
FIG. 25 shows an enrichment degree of m$^6$A sites obtained by m$^6$A-SEAL around the center of two motifs, UGUAHH and RRACH, in rice.

In mammalian cells, m⁶A was mainly concentrated in RNA motif of RRACH(R=G/A, H=A/C/T). Because the motif (UGUAMM) found in rice was quite different from it, all GGACU and UGUAMM sites in rice transcriptome were also extracted, and the positional relationship between these two sites and m⁶A sites was calculated, respectively. As shown in FIG. 25, the intensity of enrichment signals of m⁶A gradually increased as it approached the UGUAMM sites, but there was no increasing trend around GGACU sites. This indicated that in the transcriptome, m⁶A showed a colocalization trend with UGUAMM instead of GGACU sequence. The reliability of discovering new rice motifs was verified from another side.

(10) the $m^6A$ Conserved Motif in Rice could be Verified by Experiments

Figure 26:
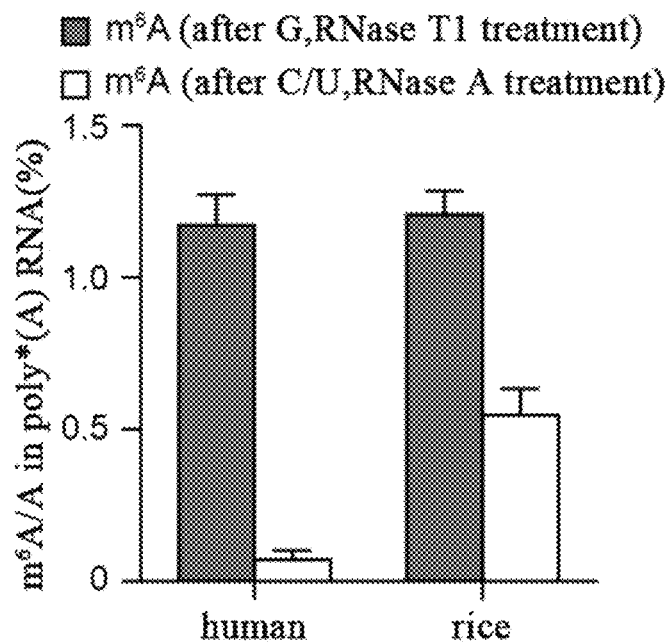
FIG. 26 shows a ratio of m$^6$A and A following G or C/U bases on human or rice Poly(A)$^+$RNA.

After using $m^6A$-SEAL to confirm the new RNA motif found by antibody-based method in rice, RNase A/T1 assay was used to confirm the reliability of the new motif. At first, Poly(A)$^+$RNA from rice and human was extracted, and each RNA sample was divided into two equal parts. One part was cut with RNase T1 and then treated with nuclease P1, so that nucleosides following G on RNA were released. The other part was cut with RNase A and then treated with nuclease P1, so that nucleosides following C/U on RNA were released. After that, the released nucleosides were characterized by liquid chromatography—triple quadrupole mass spectrometer, thereby obtaining the ratio of $m^6A$ and A following G and following C/U in the sample, respectively. Results showed that in human Poly(A)$^+$RNA, $m^6A$/A following G was 10-15 times of that following C/U, while in rice, the ratio was 2-2.5 times, indicating that compared with human RNA, there was more $m^6A$ distributing following C/U in rice (FIG. 26). If $m^6A$ did not follow C in human or rice, according to the frequency of CA, UA and GA in human rice transcriptome, it could roughly estimate that $Um^6A$ is about 10% of $Gm^6A$ in human transcriptome. In rice transcriptome, $Um^6A$ was about 67% of $Gm^6A$. This indicated that the proportion of $Um^6A$ in rice transcriptome was significantly higher than that in human, indirectly verifying the conserved motif of UGUA in results of high-throughput sequencing.

Example 10 Synthesis and Characterization of N-Hydroxymethyl Guanosine and N-Hydroxymethyl Cytidine There were still some problems in the sequencing of endogenous hydroxymethylation modification. Firstly, because the content of endogenous hydroxymethyl modification was less than that of methylation modification ($hm^6A$ is less than 10% of $m^6A$) (Fu et al., 2013), the difficulty of labeling, enrichment and library construction might be greatly increased. Secondly, in addition to adenine, hydroxymethylation modifications might also exist on other bases (such as guanine, cytosine and uracil) in Poly(A)$^+$ RNA, and these modifications might also react with thiol compounds, so the enriched nucleic acid fragments might be a mixture with different hydroxymethylation modifications. Different hydroxymethyl adenine nucleosides were synthesized and used as HPLC-QQQ-MS/MS standard samples.

(1) Experiment Materials and Agents

Guanosine (J&K Chemical), thymidine (J&K Chemical), uridine (J&K Chemical), formaldehyde (37% aqueous solution) (Guangzhou Xilong Fine Chemical Technology Co., Ltd.)

(2) Synthesis and Purification of Hydroxymethylated Guanosine 0.2 g guanosine was dissolved in 4 mL water to form a suspension, and after 0.4 mL 37% formaldehyde was added to react for 12 h at 70° C., 4 mL 20% glycine was added to stop the reaction. The products were purified by preparative HPLC columns. Loading quantity of samples was 50-200 mg, and gradient was 2-6% acetonitrile (0-20 min). A first major peak eluting products was collected (eluting products at about 15.3 min), and the products were freeze-dried.

(3) Synthesis and Purification of Hydroxymethylated Cytidine 0.2 g cytidine was dissolved in 4 mL water to form a solution, and after 0.4 mL 37% formaldehyde was added to react for 10 h at 70° C., 4 mL 20% glycine was added to stop the reaction. The products were purified by preparative HPLC columns. Loading quantity of samples was 50-200 mg, and gradient was 2-6% acetonitrile (0-20 min). A second major peak eluting products was collected (eluting products at about 10.3 min), and the products were freeze-dried.

(4) Characterization and Analysis of Hydroxymethylated Nucleoside

Figure 27A:
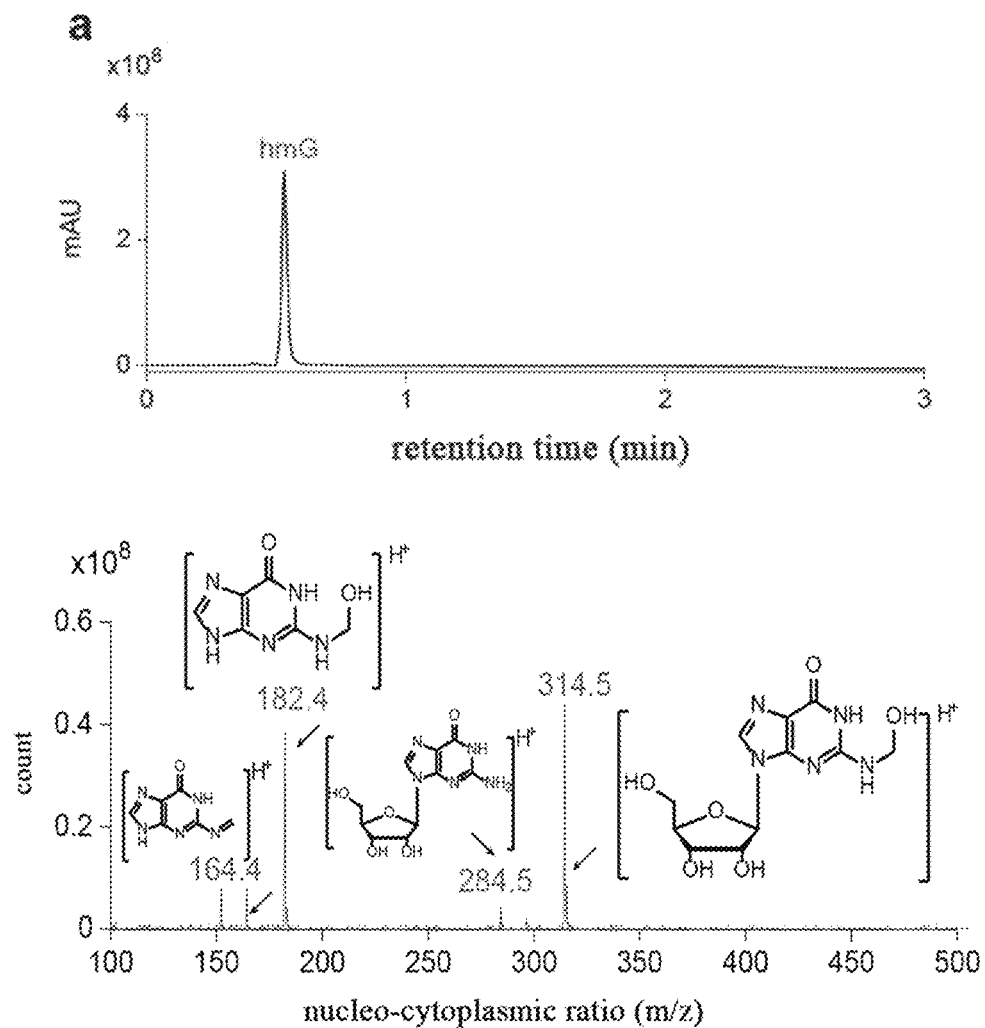
FIG. 27A shows the chromatogram and fragment ions of hydroxymethylated guanosine.
Figure 27B:
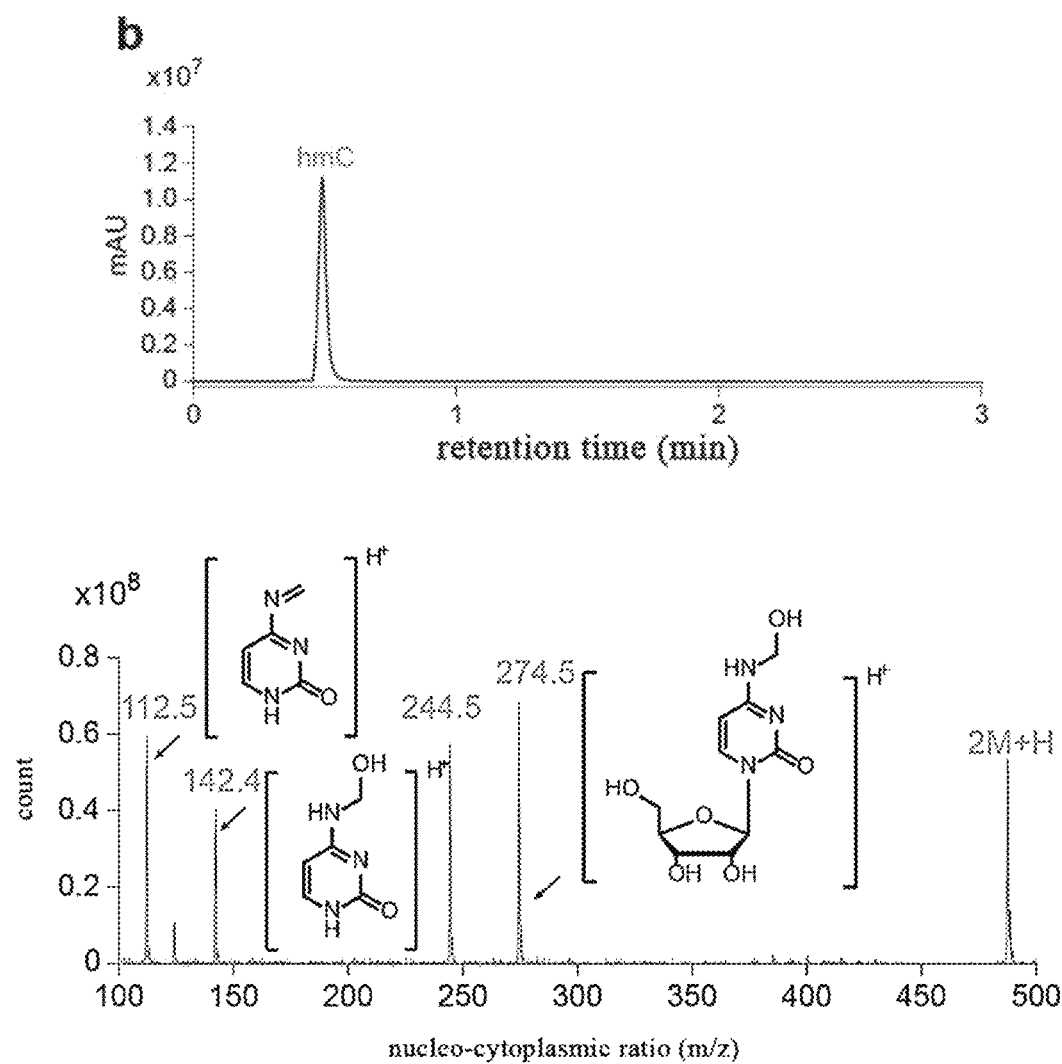
FIG. 27B shows the chromatogram and fragment ions of hydroxymethylated thymidine.

LC-MS results showed that the mass-to-charge ratio (m/z) of the reaction product of formaldehyde and guanosine was 314.5, which was consistent with m/z of hydroxymethylated guanosine plus hydrogen ions. Meanwhile, fragment ions of 284.5 could be seen (FIG. 27A), which might be caused by the partial degradation of hydroxymethylated guanosine into guanosine during ionization. The mass-to-charge ratio (m/z) of the reaction of formaldehyde and cytidine was 274.5, which was consistent with m/z of hydroxymethylated cytidine plus hydrogen ions. Meanwhile, fragment ions of 244.5 could be seen (FIG. 27B), which might be caused by the partial degradation of hydroxymethylated cytidine into adenosine during ionization. The synthesized and purified hydroxymethylated nucleoside could be used as measurement and standard samples subsequently.

Example 11 Reaction of N-Hydroxymethyl Guanosine and N-Hydroxymethyl Cytidine with a Thiol Compound (1) Experiment Materials and Agents Dithiothreitol (INACOL), HEPES buffer salt solution (1M, pH=4)

(2) Experimental Apparatus

Thermomixer (Eppendorf)

(3) Experiment Steps

A reaction system was as shown in Table 8.

TABLE 8

Reaction system of N-hydroxymethyl guanosine, N-hydroxymethyl cytidine and dithiothreitol

| component | concentration of stock solution | final concentration | added volume (μL) |
| --- | --- | --- | --- |
| hmG/hmC | 5 mM | 1 mM | 20 |
| DTT | 1M | 200 mM | 20 |
| HEPES pH = 4 | 1M | 100 mM | 10 |
| water | | | 50 |

Hydroxymethyl nucleoside solution and DTT were added to a 1.5 ml EP tube, respectively, and then HEPES buffer salt solution with pH=4 was added to react for 3 h on the thermomixer at 37° C. The product was diluted to 100 times for identification. An UV absorption channel for monitoring was 265 nm, and the mass-to-charge ratio ratio m/z ranged from 100 to 700 monitored by the mass spectrometry.

(4) Experiment Results

Figure 28:
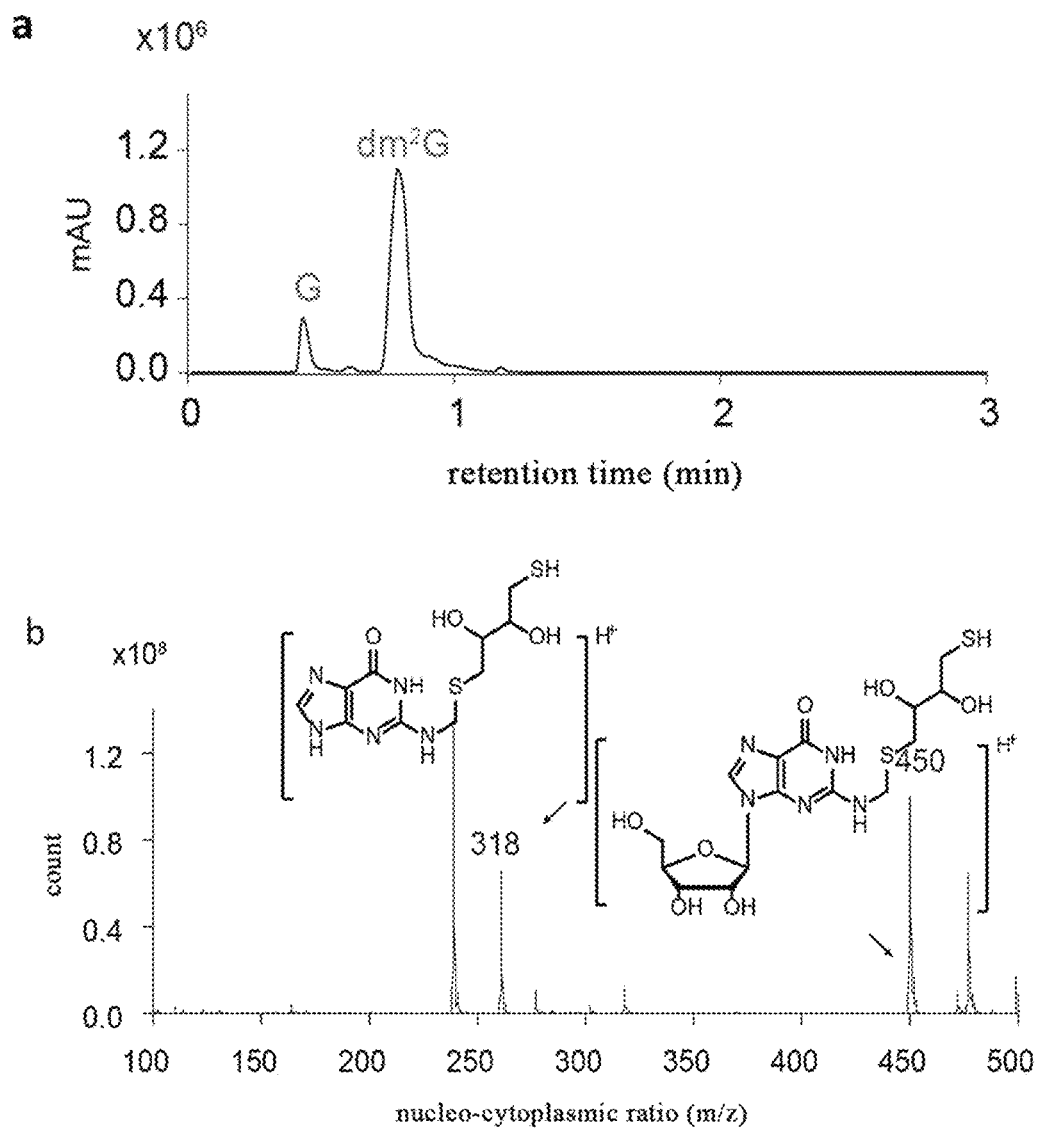
FIG. 28 shows the chromatogram (a) and fragment ions (b) of reaction products of hydroxymethylated guanosine and DTT.

After hydroxymethyl guanosine was reacted for 3 h at 37° C., new products $dm^2G$ was generated. This product was more hydrophobic (longer elution time), with a absorption peak of 258 nm, which was increased compared with hydroxymethyl guanosine (254 nm). The m/z of the reaction product was 450, and the fragment ion (m/z=318) was the base without sugar ring, which was consistent with the expected molecular weight (FIG. 28).

Figure 29:
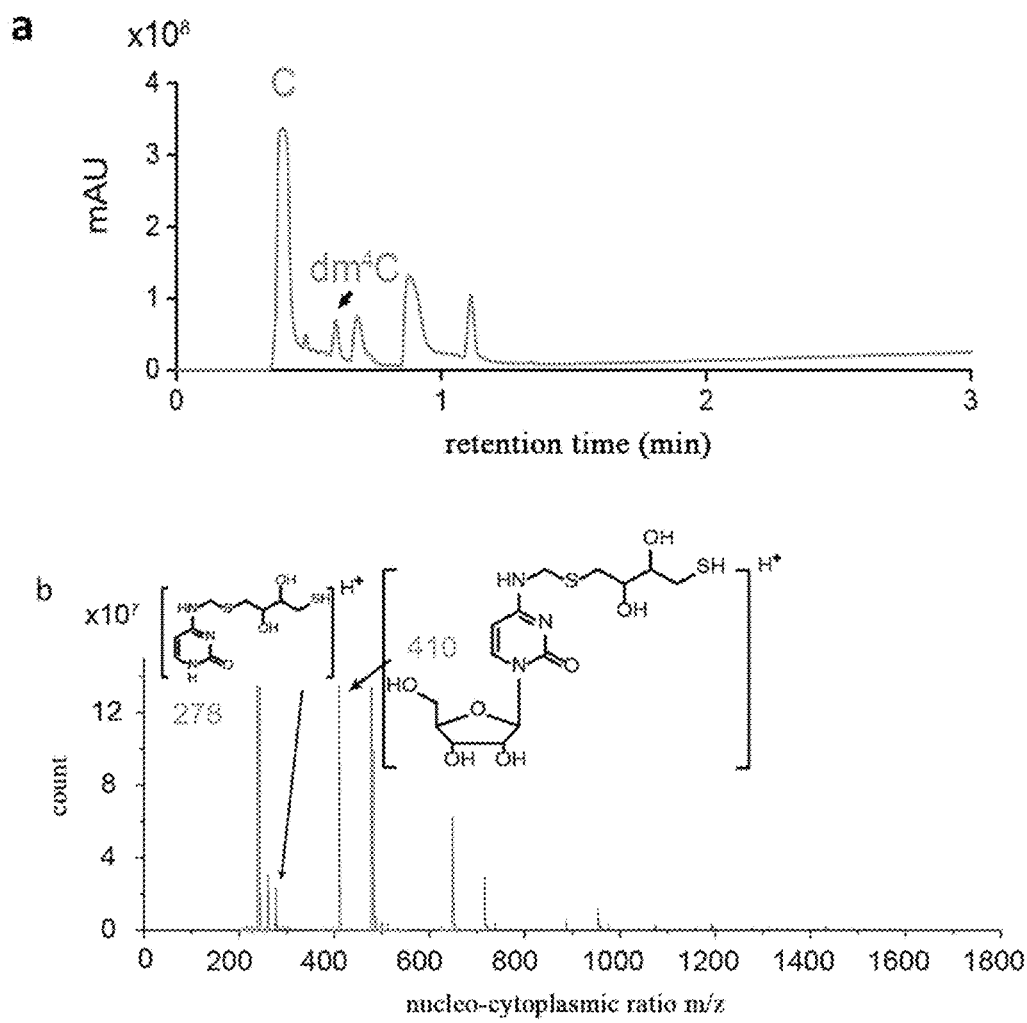
FIG. 29 shows the chromatogram (a) and fragment ions (b) of reaction products of hydroxymethylated thymidine and DTT.

After hydroxymethyl cytidine was reacted for 3 h at 37° C., new products dm⁴G was generated. This product was more hydrophobic (longer elution time), with a absorption peak of 278 nm, which was increased compared with hydroxymethyl cytidine (276 nm). The m/z of the reaction product was 410, and the fragment ion (m/z=278) was the base without sugar ring, which was consistent with the expected molecular weight (FIG. 29).

Example 12 Identification and Quantitative Analysis of N-Hydroxymethylation Modified Nucleoside on Poly(A)⁺RNA (1) Experiment Agents
Nuclease P1(Wako), rSAP(NEB)
(2) Experiment Steps
Hydroxymethylation modified nucleoside was taken to prepare a series of standard samples, and the concentration was shown in Table 9.

TABLE 9

List of the concentration of the nucleoside standard samples

|  | hm⁶A | hmG | m⁶A |
| --- | --- | --- | --- |
| Std1 | 0.1 | 0.1 | 1 |
| Std2 | 0.5 | 0.5 | 5 |
| Std3 | 2.5 | 2.5 | 25 |
| Std4 | 10 | 10 | 100 |
| Std5 | 50 | 50 | 500 |

DEPC-treated water was added to 1 μg mRNA (extracted from cells and saved in liquid nitrogen, and taken out when loading sample) to 40 μL. After that, 1 U nuclease P1 was added for 30 min at 37° C. Then 1 U rSAP was added for 30 min at 37° C., followed by the centrifugation for 30 min in the maximum rotate speed at 4° C. and identification with standard samples by HPLC-QQQ-MS/MS.

Example 13 Reaction of N-Hydroxymethyl Modified Nucleoside on Poly(A)⁺RNA and a Thiol Compound The agents were the same with that of example 6 for the incubation of cells and the extraction of Poly(A)⁺RNA, which were not described herein.

Figure 30:
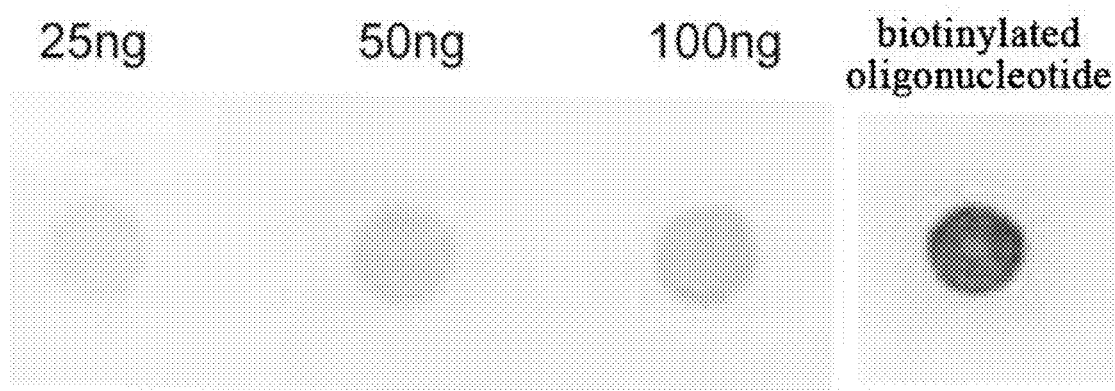
FIG. 30 shows the biotin labeling after a reaction of mRNA and DTT.

Example 14 Biotin Labeling of N-Hydroxymethyl Modified Nucleic Acid on Poly(A)⁺RNA N-hydroxymethyl modified nucleic acid was biotin-labeled by using the method same with example 7. Dot-Blot results were shown as FIG. 30 (herein the biotinylation agent was HPDP-biotin, or MTSEA-biotin, and both of them could be used for the biotin labeling of thiol function).

Example 15 Enrichment and Library Construction of the Labeled N-Hydroxymethyl Modified Fragments on Poly(A)⁺RNA The enrichment and library construction of N-hydroxymethyl modified fragments by using the method same with example 8.
Ethanol precipitation was used to recover thiolated Poly(A)⁺RNA labeled by MTSEA-biotin, leaving a small amount of RNA as input group, and the rest RNA was incubated with streptavidin magnetic beads. After incubation, the non-specific binding RNA fragments on magnetic beads were washed away, and then DTT was used to release the enriched RNA fragments from the magnetic beads. After ethanol precipitation, the concentration was measured, and it was ready to use these enriched target RNAs for library construction. Starting with 40 μg Poly(A)⁺RNA, about 300 ng could be recovered finally. This indicated that N-hydroxymethyl modified nucleic acid could be enriched after biotin labeling. The enriched RNA and the input RNA were taken to construct a library, and finally the size of the amplified double-stranded DNA fragment with adaptors was 200-600 bp, and the peak was smooth, without obvious large fragment or adaptor dimer residue. This indicated that the enriched N-hydroxymethyl modified nucleic acid could be used for library construction successfully.

Figure 31:
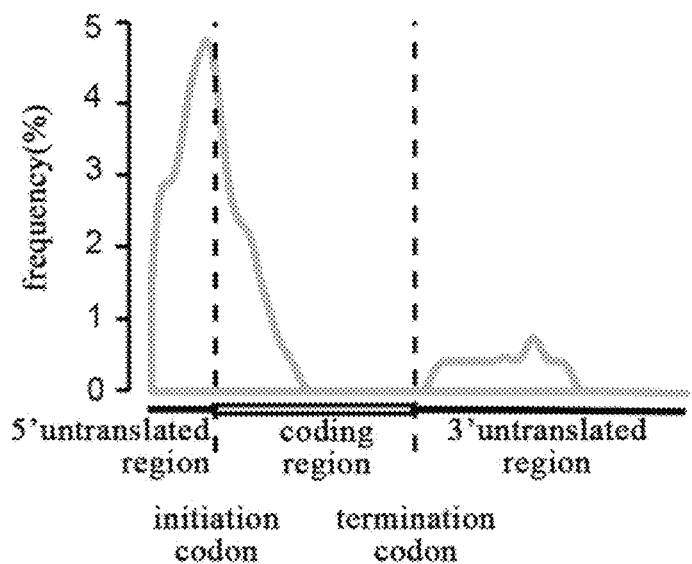
FIG. 31 shows distributions of hydroxymethylation modification on transcriptome.
Figure 32:
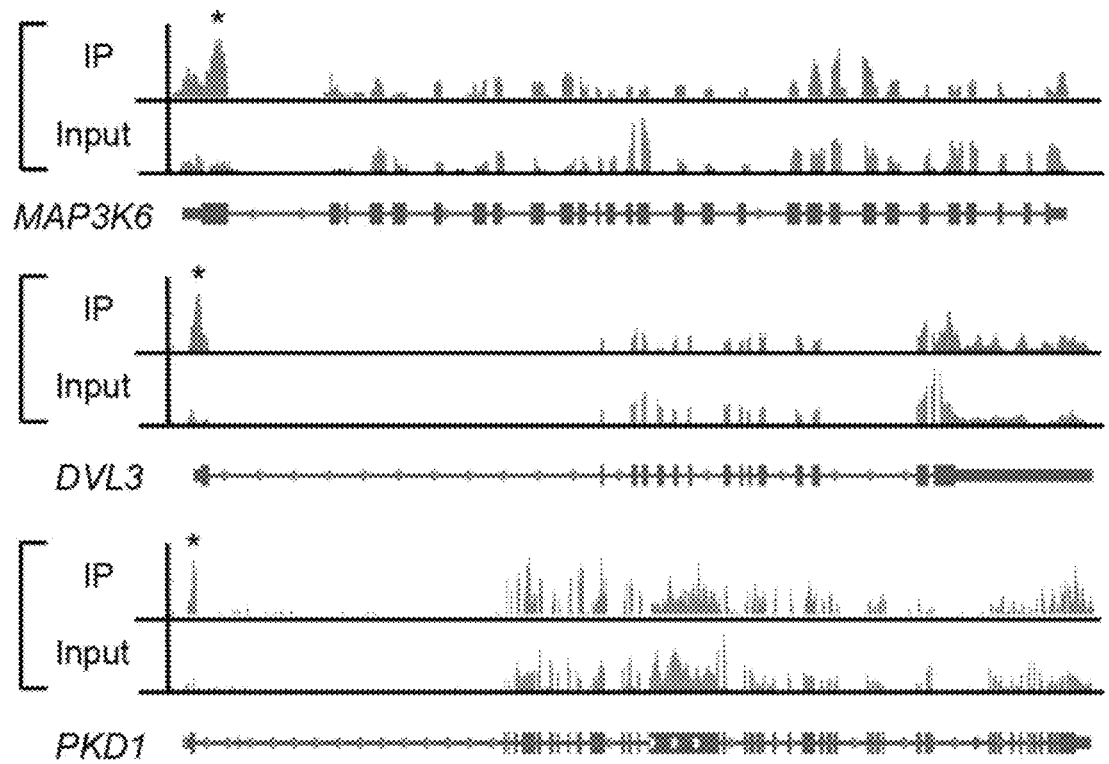
FIG. 32 shows hydroxymethylation modification on certain transcriptome in IGV genome browser.
Figure 33:
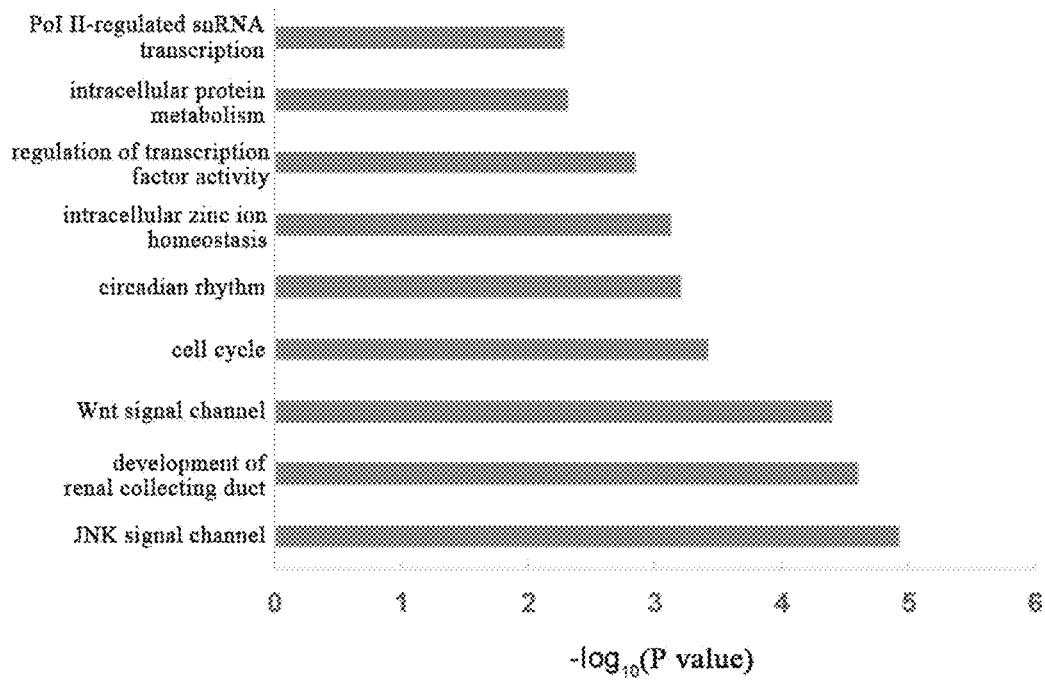
FIG. 33 shows biological function related to hydroxymethylation modification transcripts.

Example 16 Application of the Sequencing Method of N-Hydroxymethylation Modification The sequencing results were analyzed by using the method same as example 9 to access the effect of the method of the invention. The following results were obtained:
(1) The Alignment Rate of Sequencing Data to the Human Genome was High
A fastq file of the original data tested from a single sample was taken, and after the adaptor was removed, the tested sequence was aligned to the human genome by using software hisat2, and the alignment rate was 86%, which could be used for further analysis.
(2) there were about 130 Highly Credible N-Hydroxymethyl Modification Sites in Human Transcriptome
Software MACS2 was used to calculate the enrichment region of the IP group relative to the input group in the sequencing data, and strict filtering conditions (FDR <10⁻⁵, fold enrichment >3) were adopted, and the sites appearing at least twice in three biological replicates were defined as the N-hydroxymethyl modification sites found by the method of the invention. There were 130 potential hydroxymethyl sites found by the method of the invention.
(3) N-Hydroxymethyl Sites were Mainly Distributed in Gene Coding Regions in Transcripts
By drawing the distribution map of N-hydroxymethylated transcripts on transcripts, it could be found that hydroxymethyl modification was mainly distributed in 5' untranslated region (5'UTR) or initiation codon, which was quite different from m⁶A distribution (mainly in 3'UTR), which implied that hydroxymethyl modification might have different biological functions from m⁶A (FIG. 31). IGV genome browser was used to check the N-hydroxymethyl modification sites on single transcripts related to JNK pathway. It also proves its tendency to be distributed near the start codon (FIG. 31).
(4) N-Hydroxymethyl Modification had Potential Biological Function
Metascape online database was used to analyze the biological function of N-hydroxymethylated transcripts, and it was found that it was related to various biological processes such as JNK signal pathway, Wnt signal pathway and regulation of transcription factor activity, which implied that N-hydroxymethyl modification might have specific biological functions (FIG. 33).

Example 17 Oxidation of 6mA on Oligo Single-Stranded DNA

The base structure of 6mA on DNA was exactly the same with that of m⁶A on RNA. Therefore, besides m⁶A on RNA, FTO also had good demethylation activity on 6mA on single-stranded DNA, which had been proved by Jia in 2011. It was inferred that FTO also experienced two oxidation processes when removing methyl on 6mA from DNA, that is, first oxidized to 6mA, an intermediate of hydroxymethyl, and then oxidized to 6fA, an intermediate of aldehyde. If the mechanism was true, the thiol addition reaction in m6A-SEAL could also be applied to 6mA, thus it was possible to indirectly complete the chemical labeling of 6MA.

Figure 34:
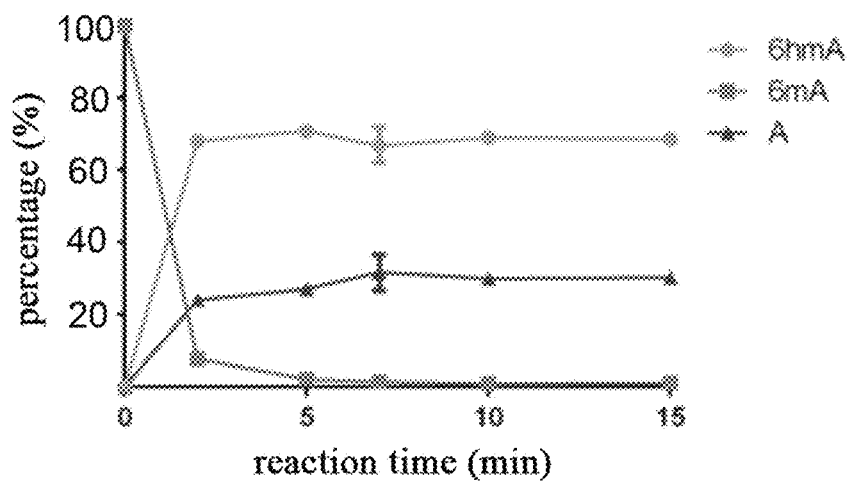
FIG. 34 shows 6mA on oligo single strand DNA oxidized by FTO.

Firstly, oligo single-stranded DNA ((6mA) TGGTGG-GAGCCGGAGACG (Seq ID No: 4)) with 6MA modification at 5' end was synthesized in solid phase to be oxidized by FTO for different time (oxidation conditions were shown in Table 10) and then the nucleoside at 5' end was released by enzyme and characterized by liquid chromatography—triple quadrupole mass spectrometer. Results showed that FTO could oxidize 6mA on oligo single-stranded DNA to 6hmA (MRM: parent ion was 282.2, and daughter ion was 135.8), and 6hmA could achieve a peak within 2 min (FIG. 34).

TABLE 10

| raw materials | concentration of stock solution | final concentration of the system | volume added (μL) |
|---|---|---|---|
| $(NH_4)_2Fe(SO_4)_2 \cdot 6H_2O$ | 28.3 mM | 300 μM | 3.18 |
| L-ascorbic acid | 200 mM | 2 mM | 3 |
| α-ketoglutaric acid | 65 mM | 300 μM | 1.38 |
| HEPES pH = 7.0 | 1M | 100 mM | 30 |
| 20mer oligo ssDNA | | 0.33 μM | 1 |
| FTO | 125 μM | 0.66 μM | 1.6 |
| H2O | | | 259.84 |
| total volume | | | 300 |

Example 18 Oxidation, Reaction with Thiol and Biotin Labeling of 6mA on DNA

Figure 35:
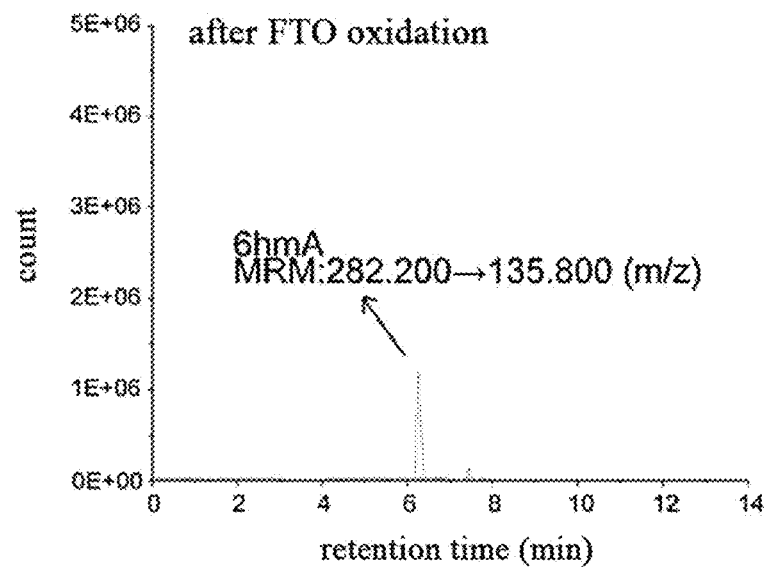
FIG. 35 shows 6mA on genome DNA oxidized by FTO.

Furthermore, it was explored whether FTO could convert 6mA on genomic DNA into 6hmA. In 2015, Fu reported that the genomic DNA of *Chlamydomonas reinhardtii* (green algae) had a high content of 6mA, so the genomic DNA of green algae was extracted, segmented to 200-300 nt by ultrasound, and denatured into small single-stranded fragments at high temperature of 95° C. After that, referring to the oxidation system of human RNA with FTO, the genomic DNA was oxidized with FTO for 10 min (oxidation conditions were shown in Table 11). After the product was digested into the single nucleoside, it was characterized by liquid chromatography-triple quadrupole mass spectrometry. It could be seen that after the treatment of FTO, 6hmA appeared on the genomic DNA (FIG. 35, parent ion was 282.2, and daughter ion was 135.8). This proved that FTO could convert 6mA on the genomic DNA into 6hmA.

TABLE 11

| raw materials | concentration of stock solution | final concentration of the system | added volume (μL) |
|---|---|---|---|
| $(NH_4)_2Fe(SO_4)_2 \cdot 6H_2O$ | 28.3 mM | 300 μM | 3.18 |
| L-ascorbic acid | 200 mM | 2 mM | 3 |
| a-ketoglutaric acid | 65 mM | 300 μM | 1.38 |
| HEPES pH = 7.0 | 1M | 100 mM | 30 |
| genome DNA | | | 900 ng |

TABLE 11-continued

| raw materials | concentration of stock solution | final concentration of the system | added volume (μL) |
|---|---|---|---|
| FTO | 125 μM | 0.2 μM | 1.6 |
| H2O | | | add to 300 μL |
| total volume | | | 300 |

Figure 36:
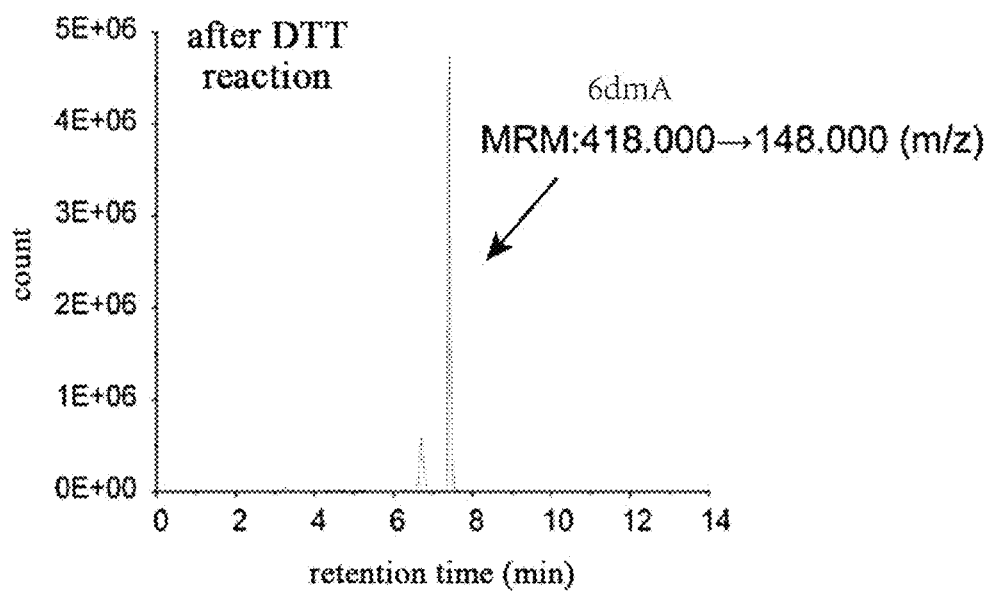
FIG. 36 shows results of reaction products of genome DNA oxidized by FTO and DTT, which are characterized by liquid chromatography—triple quadrupole mass spectrometer.

The genomic DNA oxidized by FTO was reacted with DTT in acidic condition (reaction condition was shown in table 12), and then characterized by liquid chromatography-triple quadrupole mass spectrometry. It was found that the expected product 6dmA was generated (FIG. 36, MRM: parent ion was 418.0, daughter ion was 148.0).

TABLE 12

| raw materials | concentration of stock solution | final concentration of the system | added volume |
|---|---|---|---|
| DTT | 1M | 200 mM | 20 μl |
| HEPES (3.90) | 1M | 100 mM | 10 μl |
| DNA | | | 0.1-5 μg |
| H2O | | | add to 100 μL |
| Total | | | 100 μl |

Figure 37:
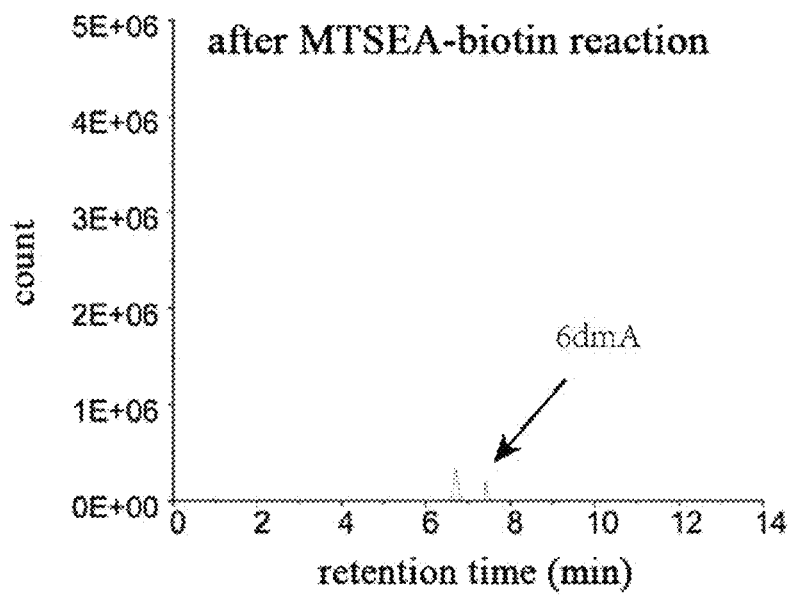
FIG. 37 shows measurement results of biotin labeling of genome DNA after reacting with DTT.
Figure 38:
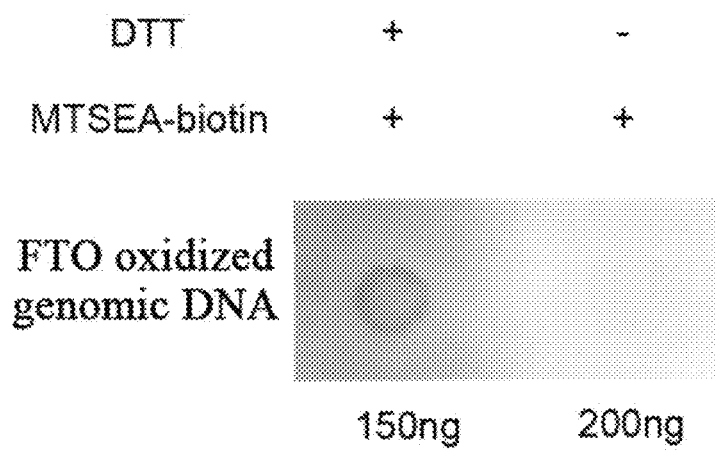
FIG. 38 shows dot-blot detection results of biotin labeling on genome DNA.

Finally the label of biotin was explored. The genomic DNA after reacting with DTT was reacted with MTSEA-biotin (reaction condition was shown in table 13), and the product was characterized by liquid chromatography-triple quadrupole mass spectrometry. Results showed that after the biotin labeling, the original signals of 6dmA on DNA decreased, which proved that the biotin labeling was successful from another side (FIG. 37). In order to prove the result of biotin labeling directly, dot-blot experiment was also used to detect the biotin signals on the genomic DNA. Results showed that the genomic DNA could be labeled with biotin successfully. However, the negative control DNA that was not reacted with DTT but directly reacted with MTSEA had no biotin signals. This indicated that the biotin labeling was successful (FIG. 38).

TABLE 13

| raw materials | concentration of stock solution | final concentration of the system | added volume (μL) |
|---|---|---|---|
| MTSEA-biotin-XX | 20 mM | 100 μM | 1 |
| HEPES (7.30) | 1M | 100 mM | 2 |
| EDTA | 500 mM | 1 mM | 0.8 |
| gDNA | | | 0.1-5 μg |
| H2O | | | add to 200 μL |
| DMF | | | 40 |
| Total | | | 200 |

Figure 39:
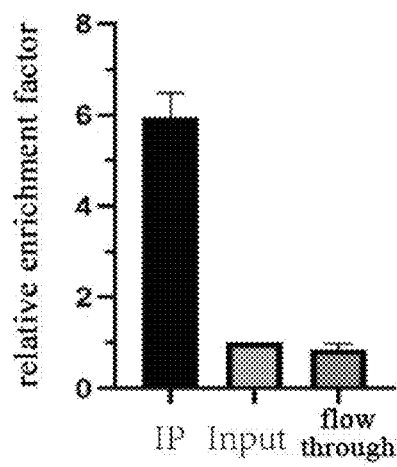
FIG. 39 shows enrichment efficiency of model DNA detected by quantitative PCR.

Example 19 Verification of the Enrichment Efficiency after being Labeled with Biotin Subsequently, it was verified whether DNA could be enriched after being labeled with biotin on the model DNA. The model DNA was 151 nt single-stranded DNA with a 6mA modification site synthesized in vitro. The model DNA was oxidized with FTO, reacted with DTT, labeled with biotin, and then enriched with streptavidin magnetic beads. The enrichment efficiency of the model DNA was tested by quantitative PCR. Results showed that the model RNA of the IP group had almost 6-fold enrichment over the Input group, which indicated that the enrichment of biotinylated DNA was successful (FIG. 39).

DNA spike-in sequence used for qPCR detection of the enrichment degree was as follows:

with 6mA:
(SEQ ID NO: 5)
ACCTGGAACCGGCGAGAATGGTCCTAGTAGGGCCCATTGGCTAAGTG

ATCTAGACATTGCCATTCTCGATAGG(6mA)TCCGGTCAAACCTAGACGA

ATTCCAGCCGCTCGGTGTGTAGTTCTCACTTAAGACGTAAACTTGCGCTT

GTGTAG without 6mA:
(SEQ ID NO: 6)
GCCTGTAATTATCACAAACCTCATAAACCATACGGAATGTTCGCGAA

GCCTCCTAAAATTTCACACATCACTATGGCTCGGTTC

Example 20 Application in the 6 mA High-Throughput Sequencing

This technique was applied to the high-throughput sequencing of 6mA sites on the genomic DNA. NEB DNA kit was used for library construction, and the process was as follows: firstly, one end of fragmented double-stranded gDNA was repaired to a blunt end by end-repair enzyme. Then, Taq DNA polymerase was used to add a dA tail to 3' blunt end of double-stranded DNA, which was beneficial to the ligation of an adaptor of a stem loop structure to DNA end of the target fragment. After ligation, the middle of the stem loop was cut off with USER enzyme, and the resulted double-stranded DNA was then denatured into single-stranded DNA, which could oxidize 6mA thereon into 6hmA with FTO. After reaction with DTT and labeled with biotin, the biotin-labeled fragment could be enriched with streptavidin magnetic beads. After elution with DTT, the target DNA fragment could be amplified by PCR using corresponding primers according to the adaptor sequence. Finally, the double-stranded DNA library with adaptor produced by PCR amplification could be used for high-throughput sequencing.

Figure 40:
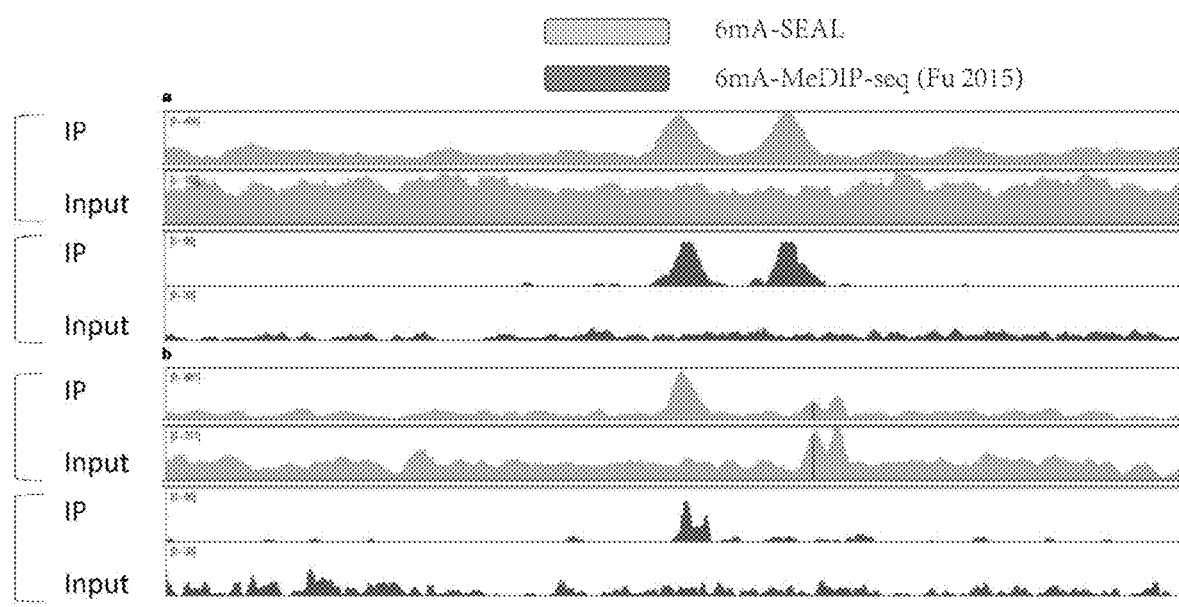
FIG. 40 shows an overlap of 6mA sites on genome DNA sequenced by using the method of the invention and reported 6mA sites.
Figure 41:
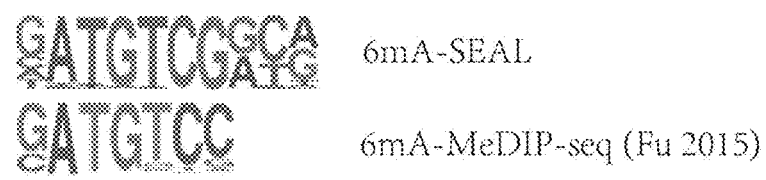
FIG. 41 shows conserved motifs of 6mA sites on genome DNA sequenced by using the method of the invention and reported 6mA sites.

A total of 374 6mA sites could be obtained from the tested samples, while about 10,000 6mA sites were obtained by previous antibody-based method, indicating that there was still much room for improvement for this method, and it was necessary to further optimize the experimental conditions of oxidation and other steps. Comparing these sites with the reported 6mA sites, it was found that most of the sites were the reported actual 6mA sites (FIG. 40). The conserved motifs around these 374 6mA sites were also analyzed, and the conserved sequence of GATGTC was measured, which was consistent with the conserved sequence reported (FIG. 41), indicating that the 6mA sites obtained by this method were true.

Example 21 Identification of FTO Demethylation Substrate

After extracting poly(A)$^+$ RNA from the over-expressed FTO cell line (or leukemia cells) and the control cell line, they were reacted with DTT at 37° C. and pH=4 respectively for 3 h, and then RNA after reaction was recovered by ethanol precipitation. Then they were reacted with MTSEA-biotin respectively, completing biotin labeling and purifying by ethanol precipitation. The labeled N-hydroxymethylation modified fragments in the two groups were enriched with streptavidin magnetic beads, and then the IP and input groups were sequenced. After analyzing the data, the N-hydroxymethyl sites in the two groups could be obtained respectively. Extra N-hydroxymethylation sites in the over-expressed FTO cell line (or leukemia cell) over the control cell line were probably potential FTO demethylation active sites, so the extra sites in the over-expressed FTO cell line (or leukemia cell) over the control cell line were FTO demethylation active regions or substrates. In addition, the over-expressed FTO cell line could be replaced by the FTO knockout cell line or the low-expressed FTO cell line. After sequencing by using the above method, the reduced hydroxymethyl sites in FTO knockout or low-expressed FTO cell lines over the control cell line were also FTO demethylation substrate sites.

The above is only preferred embodiments of the present invention, and is not intended to limit the present invention. Any modifications, equivalent substitutions, improvements, etc. made within the spirit and principles of the present invention shall be included in the scope of protection of the present invention.

The invention claimed is:
1. A chemical tagging method for m⁶A-containing nucleic acid enrichment, comprising:
   (1) treating a sample containing RNA and/or DNA with FTO or formaldehyde, wherein m⁶A is converted into hm⁶A under the presence of m⁶A in the RNA and/or DNA;
   (2) adding a thiol compound, wherein the hm⁶A is reacted with the thiol compound to produce dm⁶A;
   (3) adding MTSEA-biotin in a biotin tagging system to react with the dm⁶A to obtain biotinylated RNA and/or DNA; and
   (4) enriching the biotinylated RNA and/or DNA by using streptavidin;
   wherein the thiol compound has a structure of formula (I):

wherein R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol.

2. The method according to claim 1, wherein the FTO is supplied in a FTO oxidation system, and a concentration of FTO in the FTO oxidation system is 0.01-2 µM.

3. The method according to claim 1, wherein the thiol compound is selected from the group consisting of one or more of

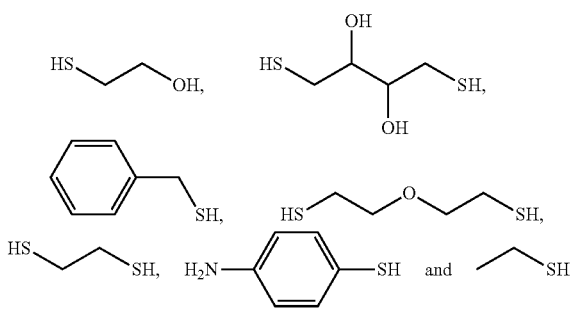

4. The method according to claim 1, wherein the hm⁶A is reacted with the thiol compound at a pH of 2-7 at 25-40° C., and for 1-5 h.

5. The method according to claim 1, wherein the MTSEA-biotin is supplied in a biotin tagging system, and a concentration of MTSEA-biotin in the biotin tagging system is 0.01-1 mM.

6. The method according to claim 1, wherein the RNA is total RNA, poly(A)⁺RNA, rRNA or lncRNA extracted from cells.

7. A chemical tagging method for N-hydroxymethyl modified nucleoside sequencing, comprising:
   (1) adding a thiol compound to a sample containing RNA and/or DNA to react N-hydroxymethyl modified nucleoside in the RNA and/or DNA with the thiol compound under the presence of N-hydroxymethyl modified nucleoside in the RNA and/or DNA;
   (2) adding MTSEA-biotin or HPDP-biotin to react to obtain biotinylated RNA and/or DNA;
   (3) enriching the biotinylated RNA and/or DNA by using streptavidin; and
   (4) eluting and recovering the biotinylated RNA and/or DNA, constructing libraries and carrying out high-throughput sequencing to determine N-hydroxymethyl modified nucleoside sites in the RNA and/or DNA;
   wherein the thiol compound has a structure of formula (I):

wherein R is selected from the group consisting of $C_1$-$C_6$ alkyl, $C_1$-$C_6$ alkyl substituted by one or more substituents selected form the group consisting of hydroxyl, thiol and combinations thereof, $C_1$-$C_6$ alkyl phenyl, phenyl substituted by amino and $C_1$-$C_6$ ether group substituted by thiol.

8. The method according to claim 7, wherein the N-hydroxymethyl modified nucleoside is selected from the group consisting of N-hydroxymethyl guanosine, N-hydroxymethyl cytidine and N-hydroxymethyl adenosine.

9. The method according to claim 1 wherein the RNA is total RNA, poly(A)⁺RNA, rRNA or lncRNA extracted from cells.

10. The method according to claim 7, wherein N-hydroxymethyl modified nucleoside is hm⁶A, and the method comprises:
    (1) treating a sample containing RNA and/or DNA with FTO or formaldehyde to convert m⁶A into hm⁶A;
    (2) adding the thiol compound, wherein the hm⁶A is reacted with the thiol compound to produce dm⁶A;
    (3) adding MTSEA-biotin to react with the dm⁶A to obtain biotinylated RNA and/or DNA;
    (4) enriching the biotinylated RNA and/or DNA by using streptavidin;
    (5) eluting and recovering the biotinylated RNA and/or DNA, constructing libraries, and carrying out high-throughput sequencing to determine m⁶A sites in the RNA and/or DNA.

11. The method according to claim 2, wherein the FTO oxidation system also comprises $(NH_4)_2Fe(SO_4)_2·6H_2O$, L-ascorbic acid and α-ketoglutaric acid, and optionally HEPES buffer salt solution with a pH of 7.0.

12. The method according to claim 2, wherein the sample containing RNA and/or DNA is treated with the FTO oxidation system for 1-30 min.

13. The method according to claim 3, wherein the thiol compound is

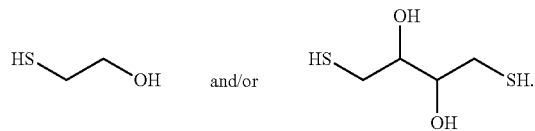

14. The method according to claim 4, wherein a molar ratio of the thiol compound and the RNA and/or DNA is 100,000:1-100:1.

15. The method according to claim 5, wherein the biotin tagging system also comprises HEPES buffer salt solution with a pH of 7.0, EDTA and DMF.

16. The method according to claim 7, wherein the thiol compound is one or more selected from the group consisting of

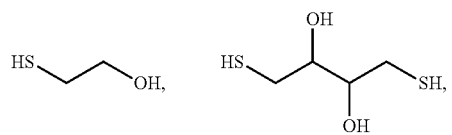

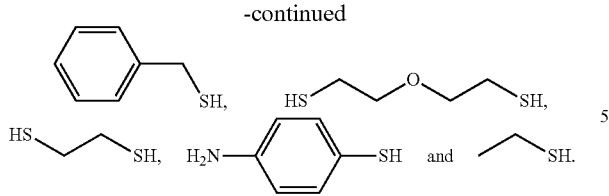
17. The method according to claim 16, wherein the thiol compound is
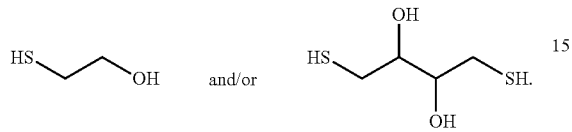
18. The method according to claim 8, wherein the N-hydroxymethyl modified nucleoside is selected from the group consisting of hm⁶A, hm⁴C and hm²G.
* * * * *

SEQUENCE LISTING

<160> NUMBER OF SEQ ID NOS: 6

<210> SEQ ID NO 1
<211> LENGTH: 180
<212> TYPE: DNA
<213> ORGANISM: Artificial Sequence
<220> FEATURE:
<223> OTHER INFORMATION: Synthetic construct

<400> SEQUENCE: 1
attttggact ggatcgagga caacctggaa tcgccactgt cactggagaa agtgtcagag    60
cgttcgggtt actccaaatg gcacctgcaa cggatgttta aaaagaaac cggtttcatc   120 cgcaatagca gctgcattaa tgaatcggcc aacgcgcggg gagaggcggt ttgcgtattg   180

<210> SEQ ID NO 2
<211> LENGTH: 180
<212> TYPE: DNA

<213> ORGANISM: Artificial Sequence
<220> FEATURE:
<223> OTHER INFORMATION: Synthetic construct

<400> SEQUENCE: 2

```
gtcggtcgac ctgggagcac tgacccgtat gctggatcgc ctggtctgta aaggctgggt      60
ggaaaggttg ccgaacccga atgacaagcg cggcgtactg gtaaaactta ccaccggcgg     120
cgcggcaata tgtgaacaat gccatcaatt agttggccag gacctgcacc aagaattaac     180
```

<210> SEQ ID NO 3
<211> LENGTH: 181
<212> TYPE: DNA
<213> ORGANISM: Artificial Sequence
<220> FEATURE:
<223> OTHER INFORMATION: Synthetic construct

<400> SEQUENCE: 3

```
tttttgtgt cttgccttt ttctttttt tggcttttg ctttccttcc ctttctgttt         60
gccgcgtgcc ttcttttcg ggttttcctg accgctgttc cgtgggtgtt ctttctgttc     120
tgtggggctt tcgtggtcgg ctgtcgggtt ccctttcttt ggccctgttg gccggcctgc    180
t                                                                    181
```

<210> SEQ ID NO 4
<211> LENGTH: 19
<212> TYPE: DNA
<213> ORGANISM: Artificial Sequence
<220> FEATURE:
<223> OTHER INFORMATION: Synthetic construct

<400> SEQUENCE: 4

```
atggtgggag ccggagacg                                                  19
```

<210> SEQ ID NO 5
<211> LENGTH: 149
<212> TYPE: DNA
<213> ORGANISM: Artificial Sequence
<220> FEATURE:
<223> OTHER INFORMATION: Synthetic construct

<400> SEQUENCE: 5

```
acctggaacc ggcgagaatg gtcctagtag ggcccattgg ctaagtgatc tagacattgc      60
cattctcgat aggatccggt caaacctaga cgaattccag ccgctcggtg tgtagttctc     120
acttaagacg taaacttgcg cttgtgtag                                      149
```

<210> SEQ ID NO 6
<211> LENGTH: 84
<212> TYPE: DNA
<213> ORGANISM: Artificial Sequence
<220> FEATURE:
<223> OTHER INFORMATION: Synthetic construct

<400> SEQUENCE: 6

```
gcctgtaatt atcacaaacc tcataaacca tacggaatgt tcgcgaagcc tcctaaaatt      60
tcacacatca ctatggctcg gttc                                            84
```